(12) United States Patent
Fan et al.

(10) Patent No.: US 9,686,819 B2
(45) Date of Patent: Jun. 20, 2017

(54) METHODS, DEVICES AND SYSTEMS FOR ROUTER ACCESS CONTROL

(71) Applicant: Xiaomi Inc., Beijing (CN)

(72) Inventors: Jialin Fan, Beijing (CN); Heng Qu, Beijing (CN); Guizhen Yang, Beijing (CN); Yongfeng Xia, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/495,189

(22) Filed: Sep. 24, 2014

(65) Prior Publication Data

US 2015/0089600 A1 Mar. 26, 2015

Related U.S. Application Data

(63) Continuation of application No. PCT/CN2014/077394, filed on May 13, 2014.

(30) Foreign Application Priority Data

Sep. 24, 2013 (CN) .......................... 2013 1 0439636

(51) Int. Cl.
*H04W 84/12* (2009.01)
*H04L 29/06* (2006.01)
*H04W 12/04* (2009.01)

(52) U.S. Cl.
CPC ............ *H04W 84/12* (2013.01); *H04L 63/10* (2013.01); *H04W 12/04* (2013.01)

(58) Field of Classification Search
None
See application file for complete search history.

(56) References Cited

U.S. PATENT DOCUMENTS

| 7,917,151 B2 * | 3/2011 | Gessner ................ H04W 88/08 455/403 |
| 9,112,849 B1 * | 8/2015 | Werkelin Ahlin ............... H04N 21/25816 |
| 2006/0190991 A1 | 8/2006 | Iyer |
| 2008/0044024 A1 | 2/2008 | Oh et al. |

(Continued)

FOREIGN PATENT DOCUMENTS

| CN | 1665183 | 9/2005 |
| CN | 1774907 | 5/2006 |

(Continued)

OTHER PUBLICATIONS

Extended European Search Report issued in European Application No. 14185664.1, dated Feb. 6, 2015 (6 pgs).

(Continued)

*Primary Examiner* — Trang Doan
(74) *Attorney, Agent, or Firm* — Finnegan, Henderson, Farabow, Garrett & Dunner LLP

(57) ABSTRACT

A method for controlling access to a router is provided. The method includes: transmitting a first connection request for establishing a connection using a visitor identity to a router, wherein the first connection request comprises a user identification of a first terminal device; receiving indication information which is transmitted from a second terminal device, the indication information indicating that access to the router is permitted; and transmitting a second connection request for establishing a connection to the router, wherein the second connection request comprises the received indication information.

10 Claims, 25 Drawing Sheets

(56) References Cited

U.S. PATENT DOCUMENTS

| | | |
|---|---|---|
| 2009/0205025 A1 | 8/2009 | Lin et al. |
| 2010/0046486 A1* | 2/2010 | Maruyama ............ G06F 21/36 370/338 |
| 2012/0239916 A1* | 9/2012 | Malasani ............ H04L 41/0806 713/1 |
| 2013/0095789 A1* | 4/2013 | Keevill ................ H04W 12/06 455/411 |
| 2013/0111554 A1* | 5/2013 | Sposato ................ H04L 63/20 726/4 |
| 2013/0166910 A1* | 6/2013 | Wilkinson ............ H04W 12/04 713/168 |
| 2013/0185455 A1* | 7/2013 | Nunberg ............ H04L 67/2823 709/238 |
| 2013/0198383 A1 | 8/2013 | Tseng et al. |
| 2014/0073244 A1* | 3/2014 | Ko ........................ H04W 4/008 455/41.1 |
| 2014/0095864 A1* | 4/2014 | Dasgupta ................ H04L 45/64 713/155 |

FOREIGN PATENT DOCUMENTS

| | | |
|---|---|---|
| CN | 101064655 | 10/2007 |
| CN | 101083556 | 12/2007 |
| CN | 101668325 | 3/2010 |
| CN | 102547702 | 7/2012 |
| CN | 102550063 | 7/2012 |
| CN | 102869014 | 1/2013 |
| CN | 103024041 | 4/2013 |
| CN | 103139201 | 6/2013 |
| CN | 103200567 | 7/2013 |
| CN | 103297967 | 9/2013 |
| CN | 103298072 | 9/2013 |
| CN | 103475667 | 12/2013 |
| CN | 103607712 | 2/2014 |
| EP | 2608447 | 6/2013 |
| EP | 2608447 A2 | 6/2013 |
| JP | 2003157233 | 5/2003 |
| JP | 2008066969 | 3/2008 |
| JP | 2012054918 | 3/2012 |
| KR | 20090042125 A | 4/2009 |
| KR | 20130079120 A | 7/2013 |
| RU | 2462832 | 9/2012 |
| WO | WO 2005083928 | 9/2005 |

OTHER PUBLICATIONS

"Relay Network," from Wikipedia, the free encyclopedia, Mar. 14, 2013 (1 pg).

International Search Report of PCT/CN2014/077394, mailed from the State Intellectual Property Office of China on Aug. 26, 2014.

Office Action for Korean Application No. 10-2014-7021472, from the Korean Intellectual Property Office, dated Nov. 23, 2015.

Office Action for Japanese Application No. 2015-538287, from the Japanese Patent Office dated Dec. 17, 2015 (3 pages).

Yoshiko Sueda et al., "*Authorized Method Based on User's Consent to Access for Home Network*,"The Institute of Electronics, Information and Communication Engineers, IEICE Technical Report, May 2007; 6 pages.

Russian Federation Office Action for Application No. 20151215910/07, dated Jun. 2, 2016.

Antonova, G.M. et al. "*Modern Computer and Telecommunication Tools*,"Academia, Moscow Publishing Center, 2010, 7 pages.

* cited by examiner

METHODS, DEVICES AND SYSTEMS FOR ROUTER ACCESS CONTROL

CROSS-REFERENCE TO RELATED APPLICATIONS

The present application is a continuation of International Application No. PCT/CN2014/077394, filed May 13, 2014, which is based on and claims priority from Chinese Patent Application No. 201310439636.1, filed Sep. 24, 2013, the entire. contents of all of which are incorporated herein by reference.

TECHNICAL FIELD

The present disclosure generally relates to a field of communication technology and, more particularly, to methods, devices and systems for router access control.

BACKGROUND

With the development of communication technology and Internet technology, information circulation is greatly improved.

An important device in the Internet is a router. The router, which is a device used to connect respective local area network devices and wide area network devices in the Internet, can select and set a route according to a channel condition so as to transmit signals in order of sequence in the best path manner. The router is a hub and a "traffic police" of the Internet. It is common for people at home to use a mobile phone to connect to the router via a WIFI connector for access to Internet. Generally, a password is set for accessing the router so as to ensure network security and prevent others from consuming bandwidth. If a guest visits a user and desires to use the user's home WIFI network, the guest would need to have the password for accessing the router, and may access the user's home WIFI network only after inputting the password. Frequently, the password for accessing the router contains a long string of characters. This requirement of inputting the password for a guest to access a home WIFI network is inconvenient for both the user and the guest.

SUMMARY

According to a first aspect of the present disclosure, there is provided a method for controlling access to a router, comprising: transmitting a first connection request for establishing a connection using a visitor identity to a router, wherein the first connection request comprises a user identification of a first terminal device; receiving indication information which is transmitted from a second terminal device, the indication information indicating that access to the router is permitted; and transmitting a second connection request for establishing a connection to the router, wherein the second connection request comprises the received indication information.

According to a second aspect of the present disclosure, there is provided a method for controlling access to a router, comprising: receiving an access request for accessing a router, the access request comprising a user identification of a first terminal device which requests for access to the router; generating feedback information indicating whether to permit the first terminal device to access the router, based on the user identification of the first terminal device; and transmitting the generated feedback information.

According to a third aspect of the present disclosure, there is provided a method for controlling access to a router, comprising: receiving a first connection request for establishing a connection using a visitor identity, which is transmitted from a first terminal device, and establishing a connection to the first terminal device with the visitor identity, wherein the first connection request comprises a user identification of the first terminal device; transmitting an access request for accessing the router to a second terminal device, wherein the access request comprises the user identification of the first terminal device; receiving feedback information which is transmitted from the second terminal device, the feedback information indicating whether to permit the first terminal device to access the router; and determining whether the first terminal device is permitted to access to the router, according to the received feedback information.

According to a fourth aspect of the present disclosure, there is provided a terminal device, comprising: a processor; and a memory for storing instructions executable by the processor. The processor is configured to: receive an access request for accessing a router, the access request including a user identification of a first terminal device requesting for accessing the router; generate feedback information based on the user identification of the first terminal device, the feedback information indicating whether to permit the first terminal device to access the router; and transmit the generated feedback information.

According to a fifth aspect of the present disclosure, there is provided a router, comprising: a processor; and a memory for storing instructions executable by the processor. The processor is configured to: receive a first connection request for establishing a connection using a visitor identity, which is transmitted from a first terminal device, and establish a connection to the first terminal device with the visitor identity, wherein the first connection request comprises a user identification of the first terminal device; transmit an access request for accessing the router to a second terminal device, wherein the access request comprises the user identification of the first terminal device; receive feedback information which is transmitted from the second terminal device, the feedback information indicating whether to permit a first terminal device to access to the router; and determine whether the first terminal device is permitted to access to the router using a host identity, according to the received feedback information.

It is to be understood that both the foregoing general description and the following detailed description are exemplary rather than limiting the present disclosure.

BRIEF DESCRIPTION OF THE DRAWINGS

The accompanying drawings, which are incorporated in and constitute a part of this specification, illustrate the embodiments according to the present disclosure, and serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The following exemplary embodiments and description thereof intend to illustrate, rather than to limit, the present disclosure. Hereinafter, the present disclosure will be described with reference to the drawings.

In embodiments of the present disclosure, a first terminal device serving as a visitor is connected to a router initially using the visitor identity so that the router obtains a user identification of the first terminal device. The router transmits the user identification to a second terminal device serving as a host, so as to inquire whether to permit the first terminal device to access to the router using the host identity. After obtaining the host's permission, the first terminal device serving as the visitor may gain access to the router using the host identity without performing additional operations, thereby simplifying the operation process and improving efficiency of access to the router.

The embodiments relate to the first terminal device serving as a visitor, the router, and the second terminal device serving as a host, and may relate to a server connected between the router and the second terminal device. Hereinafter, a process of controlling access to a router will be described from the perspectives of the above four devices, respectively.

Figure 1:
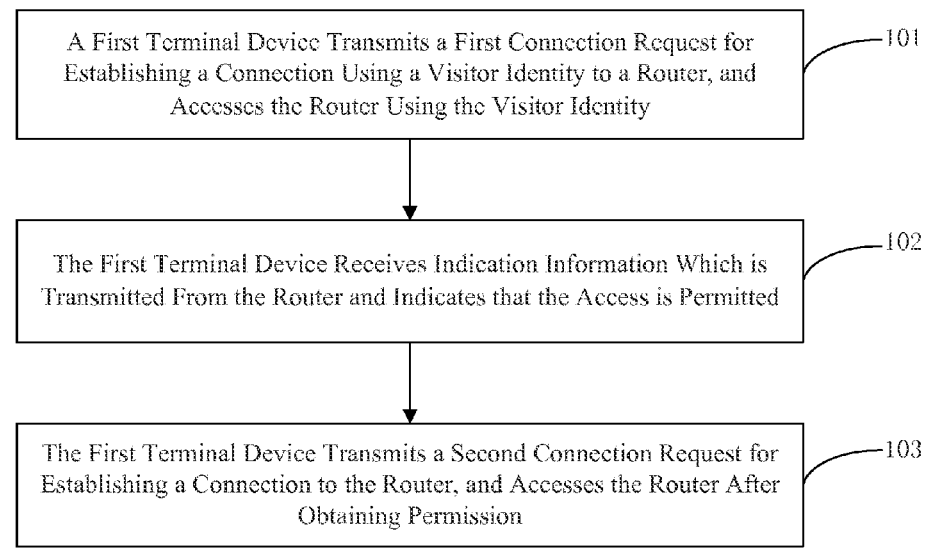
FIG. 1 is a flowchart of a process performed at a first terminal device for controlling access to a router, according to an exemplary embodiment.

Referring to FIG. 1, a flowchart of a method 100 used at the first terminal device for controlling access to a router according to an exemplary embodiment is provided.

At step 101, a first terminal device transmits a first connection request for establishing a connection using a visitor identity to a router, and accesses to the router using the visitor identity. The first connection request includes a user identification of the first terminal device. The user identification may include one or more of terminal device identification, an instant messaging account identification, a Subscriber Identification Module (SIM) card identification, a user name, and/or the user's other information which may be used to identify the user serving as the visitor.

When the first terminal device accesses to the router using the visitor identity, the first terminal device is connected to a visitor (guest) network of the router. In some embodiments, both of access bandwidth and access permission of the first terminal device using the visitor identity may be limited. For example, the access bandwidth may be limited to 50K, and the access permission may be limited to transmitting information for identity verification, such as the user identification and the like, to the router, or receiving corresponding feedback information.

At step 102, the first terminal device receives indication information transmitted from the router, which indicates that the access is permitted. The indication information indicates that the first terminal device is permitted to access to the router using the host identity. The indication information may include a password used in accessing the router.

At step 103, the first terminal device transmits a second connection request for establishing a connection to the router, and accesses the router after obtaining permission. The second connection request may include the received indication information. For example, the first terminal device may transmit the second connection request for establishing a connection using the host identity to the router, and access the router using the host identity.

Figure 2A:
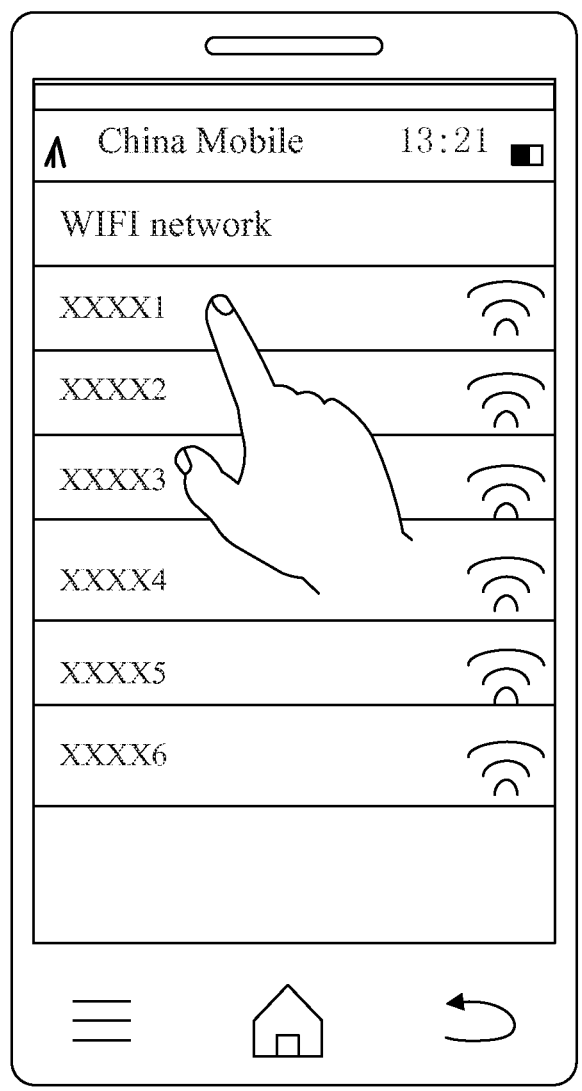
FIG. 2A is a diagram showing a search result of routers according to an exemplary embodiment.

In one embodiment, the first terminal device may search for routers in a network through a WIFI network. An example search result 200a is shown in FIG. 2A. A first user as the visitor may click an icon to select a router, and the first terminal device connects to the selected router according to the user input, i.e., transmits the first connection request for establishing a connection using a visitor identity to the router. The first terminal device can be connected to the router using the visitor identity without inputting any password. The first terminal device transmits a user identification to the router, using the visitor identity. After permitted by the host, the first terminal device obtains the indication information from the router, and connects to the router using the host identity according to the indication information. After the connection is established, the access of the first terminal device to router may be unlimited.

In the process of controlling the access, the user may only perform an operation of selecting the router, and may not need to participate in the subsequent connection process, which simplifies the operation process and improves efficiency of the access to the router. Moreover, the user as the visitor may not know what the password is in the process, which improves the security of the access to the router. The first terminal device may not need to show the user as the visitor an input box which prompts the user to input the password, and may not need to wait and respond to the user's operation of inputting the password. In doing so, the processing performed by the first terminal device may be simplified, and as a result, power consumption of the first terminal device may be reduced.

Figure 2B:
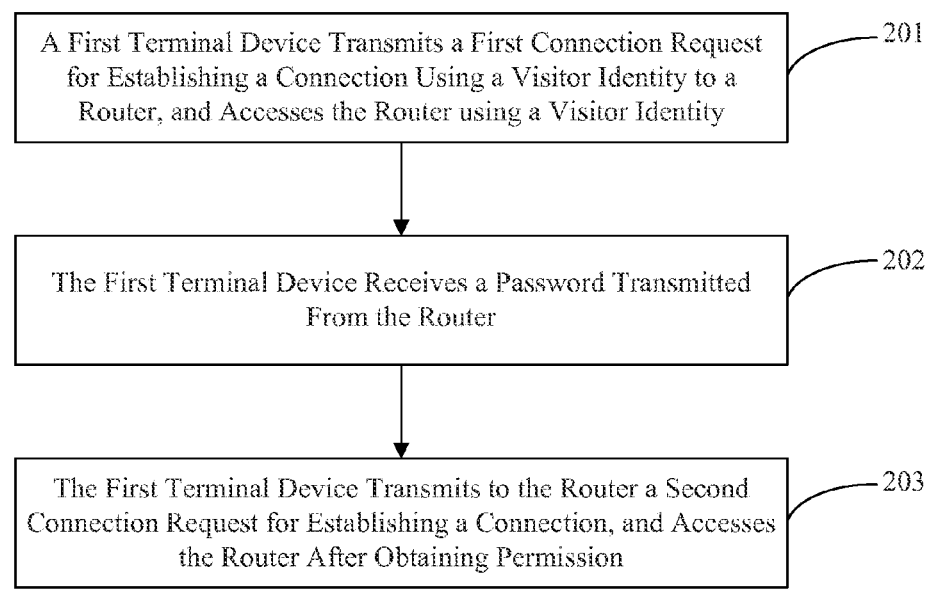
FIG. 2B is a flowchart of a process performed at a first terminal device for controlling access to a router, according to an exemplary embodiment.

Referring to FIG. 2B, a flowchart of a process 200b performed at a first terminal device for controlling access to a router is provided, according to an exemplary embodiment.

At step 201, a first terminal device transmits a first connection request for establishing a connection using a visitor identity to a router, and accesses the router using the visitor identity.

The router transmits the first connection request to a second terminal device with access control permissions (such as a mobile phone as a host). When the second terminal device permits the first terminal device to access to the router, the second terminal device returns feedback information, which indicates that the access is permitted, to the router. After receiving the above feedback information, the router transmits the password to the first terminal device. The password may be not shown at the first terminal device, and may be eliminated when the first terminal device is disconnected from the router.

At step 202, the first terminal device receives a password transmitted from the router.

At step 203, the first terminal device transmits a second connection request for establishing a connection to the router, and accesses to the router after obtaining permission. The second connection request includes the received password.

In some embodiments, if the host does not set any password in the router, the first terminal device may receive indication information which is a mark identifying that the connection to the router is permitted, by using a visitor identity. The first terminal device can transmit the second connection request including the mark. After the mark is identified by the router, the router is reconnected to the first terminal device and opens access permission for the first terminal device.

If the host has set the password in the router, the first terminal device receives indication information, which includes the password, transmitted from the router. The first terminal device transmits the second connection request including the password. The router verifies the password, and the router is reconnected to the first terminal device and opens access permission for the first terminal device after successful verification.

Figure 3:
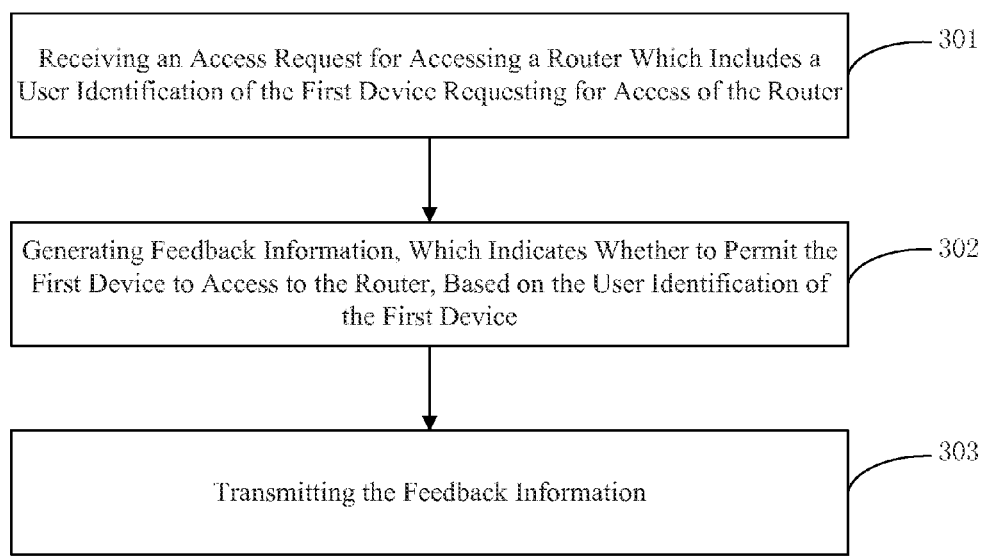
FIG. 3 is a flowchart of a process performed at a second terminal device for controlling access to a router, according to an exemplary embodiment.

In the embodiment, because the user as the visitor does not need to input the password used in the access to the router, the permission of the user serving as the host is required so as to ensure access security. FIG. 3 is an implementation process for a second terminal device serving as a host in a process for controlling access to a router, according to an exemplary embodiment.

Referring to FIG. 3, a flowchart of a process 300 performed at a second terminal device for controlling access to a router in the embodiment is provided.

At step 301, the second terminal device receives an access request for accessing a router, and the access request includes a user identification of the first terminal device which requests for accessing the router.

At step 302, the second terminal device generates feedback information, which indicates whether to permit the first terminal device to access to the router, based on the user identification of the first terminal device.

At step 303, the second terminal device transmits the feedback information.

If the second terminal device is directly connected to the router, the second terminal device may receive the access request for accessing the router from the router at step 301, and transmit the generated feedback information to the router at step 303 If the second terminal device is not directly connected to the router but is connected to the router via a server, the second terminal device may receive the access request for accessing the router from the server at step 301, and transmit the generated feedback information to the server at step 303. The second terminal device may transmit the generated feedback information to the server. The second terminal device may further instruct the server to forward the feedback information to the router. The situation that the second terminal device is connected to the router via the server may occur when the host is not at home and the host remotely controls the access of the visitor to the router.

In a first embodiment, the user as the host may preset a set of user identifications and permit a terminal device, which corresponds to a user identification included in the set of user identifications, to access to the router using the host identity. For example, the set of user identifications may include user identifications in a "family" group in an address book of the second terminal device. After the second terminal device receives the user identification of the first terminal device, a comparison may be performed between the received user identification and user identifications in the set of user identifications. If they match, e.g., the received user identification is identical to one of the set of user identifications, acknowledgement feedback information, which indicates that the first terminal device is permitted to access to the router, may be generated; if they do not match, denial feedback information, which indicates that the first terminal device is refused to access to the router, may be generated. In this embodiment, the user as the host does not need to participate in the above process, and the second terminal device may perform the process for controlling access to the router without user input, thereby improving implementation efficiency.

Figure 4:
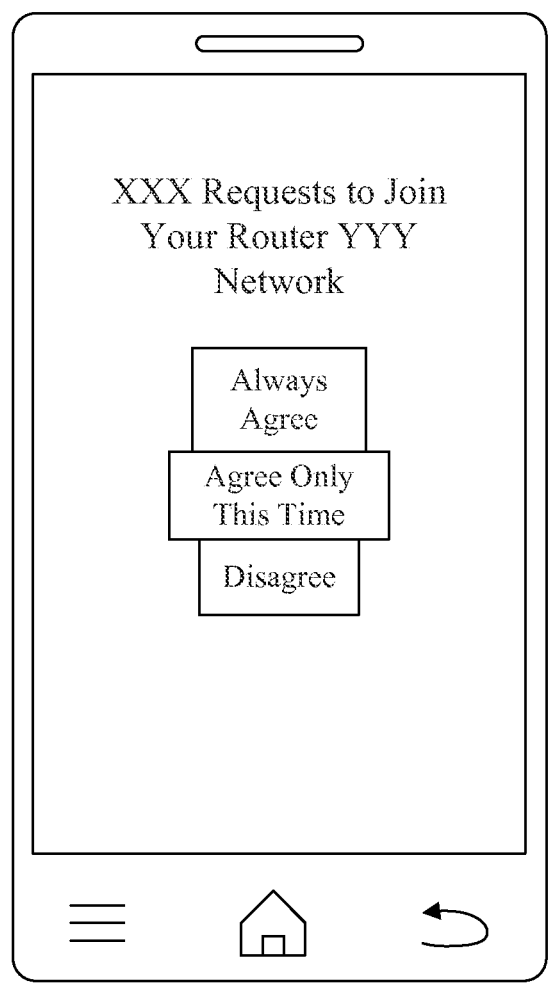
FIG. 4 is a diagram showing prompt information according to an exemplary embodiment.

In a second embodiment, after receiving the user identification of the first terminal device, the second terminal device may output prompt information including the received user identification to the user as the host. For example, the prompt information may be "XXX requests to join your router YYY network", as shown in FIG. 4. XXX is the user identification and YYY is a router identification, both of which can be obtained in step 301. As shown in FIG. 4, a user interface including operation buttons, such as "always agree", "agree only this time" and "disagree", may be output while outputting the prompt information. The user as the host may click an operation button to input an operation instruction. Alternatively, the operation instruction of clicking the operation button may be replaced with other gesture instructions, and the operation buttons may not be output.

If the user as the host clicks the operation button "always agree", the second terminal device receives an operation instruction indicating "always agree" and generates the acknowledgement feedback information for permitting the access to the router. Meanwhile, the second terminal device may store the user identification of the first terminal device. When receiving the user identification next time, the second terminal device may search the stored user identifications to determine whether the received user identification has been stored. If the received user identification has been stored, it is not required to output the prompt information, and the acknowledgement feedback information may be directly generated. If the received user identification has not been stored, the prompt information is output. The second embodiment may be combined with the first embodiment. For example, if the received user identification matches one of the set of user identifications, no prompt information is output. If the received user identification does not match any one of the set of user identification, the prompt information is output. When the operation instruction indicating "always agree" is received, the user identification may be added to the set of user identifications so as to facilitate matching when a user identification is received next time.

If the user as the host clicks the operation button "agree only this time", the second terminal device receives an operation instruction indicating "agree only this time" and generates the acknowledgement feedback information for permitting the access to the router.

If the user as the host clicks the operation button "disagree", the second terminal device receives an operation instruction indicating denial and generates the denial feedback information for denying the access to the router.

Figure 5:
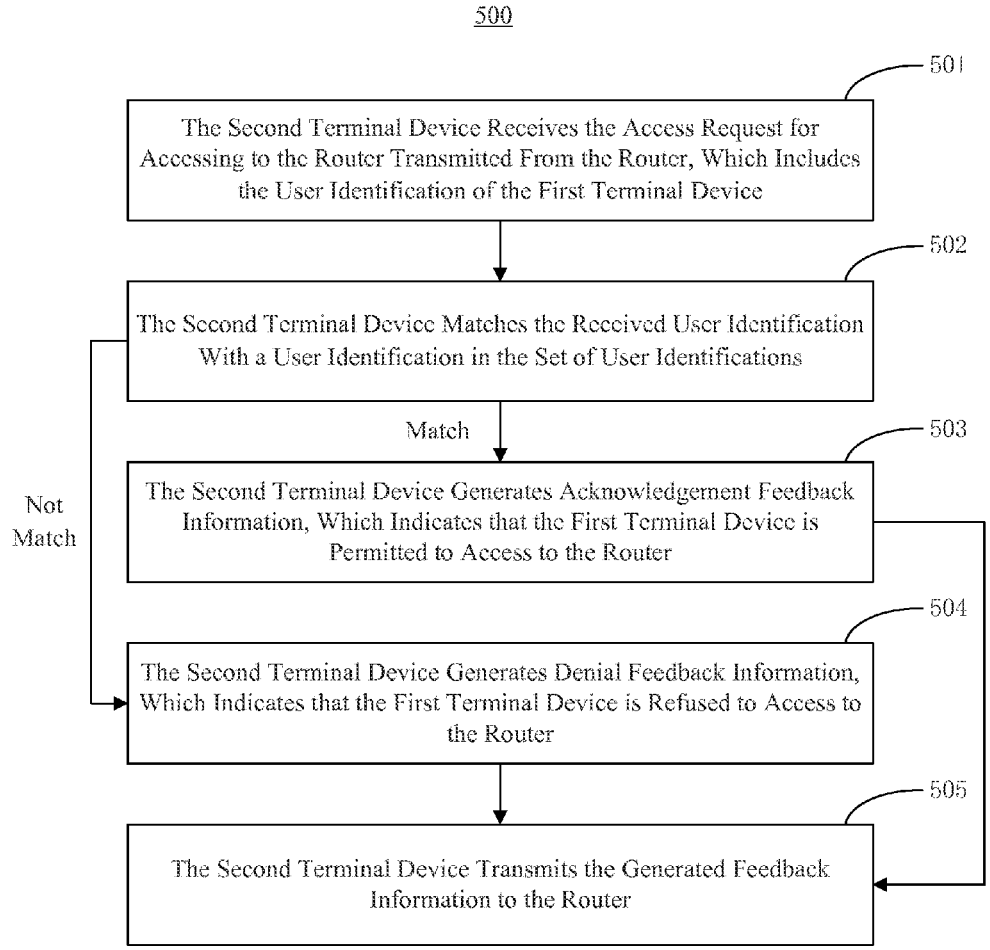
FIG. 5 is a flowchart of a process for controlling access to a router when a second terminal device is connected to a router, according to an exemplary embodiment.

FIG. 5 is an implementation process performed at the second terminal device will be described in detail.

As shown in FIG. 5, a process 500 performed by a second terminal for controlling access to a router is provided, according to an exemplary embodiment.

At step 501, the second terminal device receives the access request for accessing the router transmitted from the router, which includes the user identification of the first terminal device.

At step 502, the second terminal device compares the received user identification with user identifications in the set of user identifications. If there is a match, the process proceeds to step 503; and if there is no match, the process proceeds to step 504.

If there is a match, at step 503, the second terminal device generates the acknowledgement feedback information, which indicates that the first terminal device is permitted to access to the router. The process proceeds to step 505.

If there is no match, at step 504, the second terminal device generates the denial feedback information, which indicates that the first terminal device is refused to access to the router. The process proceeds to step 505.

At step 505, the second terminal device transmits the generated feedback information to the router.

In one embodiment, the second terminal device presets a set of user identifications, and thus may automatically perform match on the received user identification and generates corresponding feedback information. The user as the host does not need to participate in the process of controlling access to the router, which simplifies the operation process, improves responding speed to the router and improves operation efficiency.

Figure 6:
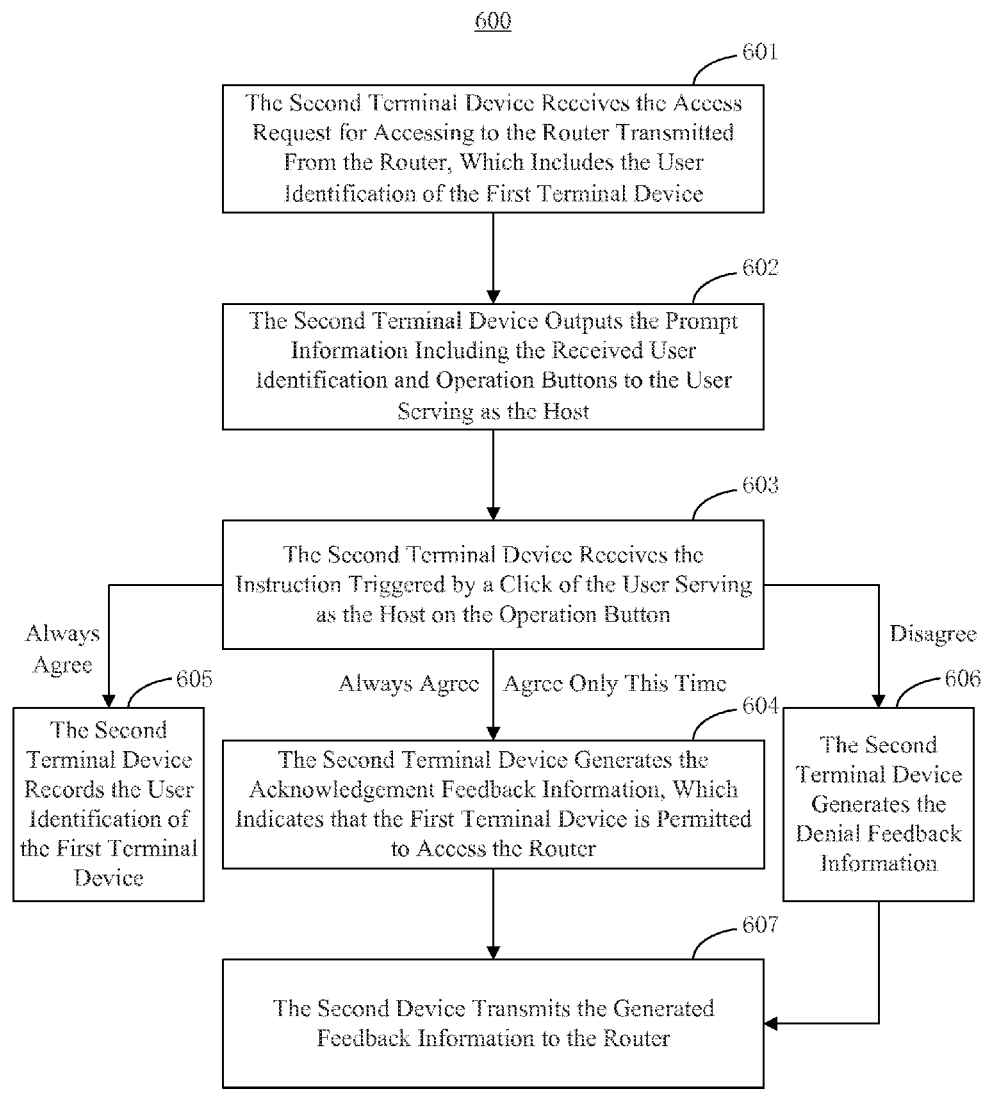
FIG. 6 is a flowchart of a process for controlling access to a router when a second terminal device is connected to a server, according to an exemplary embodiment.

As shown in FIG. 6, a process 600 performed by a second terminal device for controlling access to a router is provided, according to an exemplary embodiment. In this embodiment, the second terminal device is connected to the router.

At step 601, the second terminal device receives the access request for accessing the router transmitted from the router, which includes the user identification of the first terminal device.

At step 602, the second terminal device outputs the prompt information including the received user identification and operation buttons to the user as the host.

At step 603, the second terminal device receives the instruction from the user as the host. The instruction may be triggered in a manner that the user as the host clicks the operation button. If the instruction is an instruction indicating "always agree", the process proceeds to step 604 and step 605. If the instruction is an instruction indicating "agree only this time", the process proceeds to step 604. If the instruction is an instruction indicating "disagree", the process proceeds to step 606.

If the instruction indicates "always agree" or "agree only this time", at step 604, the second terminal device generates the acknowledgement feedback information, which indicates that the first terminal device is permitted to access to the router. The process proceeds to step 607.

If the instruction indicates "always agree", at step 605, the second terminal device also stores the user identification of the first terminal device.

If the instruction indicates "disagree", at step 606, the second terminal device generates the denial feedback information, which indicates that the first terminal device is refused to access to the router. The process proceeds to step 607.

At step 607, the second terminal device transmits the generated feedback information to the router.

In this embodiment, the second terminal device receives the user identification, and then outputs the prompt information to the user as the host so as to obtain the host's permission. Moreover, operation instructions may be provided, e.g., "always agree", "agree only this time" and "disagree". For example, the "always agree" instruction may be used for a trusted friend, whereby the host does not need to participate in the process when the request from the friend is received next time, which simplifies subsequent operations. The "agree only this time" instruction may be used for an ordinary friend, and the "disagree" instruction may be used for a stranger, so as to ensure security.

This embodiment may be combined with the embodiment shown in FIG. 5. For example, step 601 may be performed firstly, and then step 502 may be performed. The process may proceed to step 503 if there is a matching user identification. The process may proceed to steps 602-606 if there is no matching user identification. Step 607 may be performed following steps 503 and 606.

Respective implementation processes of the first and second terminal devices are described above. Below are implementation processes of the router.

Figure 7:
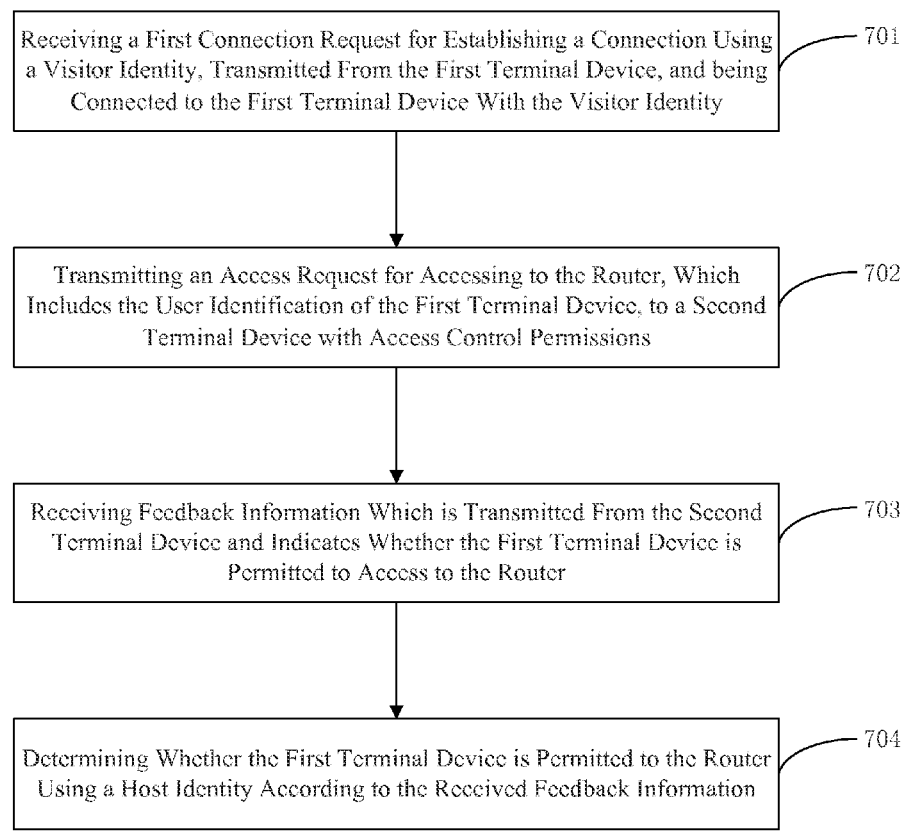
FIG. 7 is a flowchart of a process performed at a router for controlling access to a router, according to an exemplary embodiment.

As shown in FIG. 7, a process 700 performed at a router for controlling access to a router is provided, according to an exemplary embodiment.

At step 701, the router receives a first connection request for establishing a connection using a visitor identity transmitted from the first terminal device, and is connected to the first terminal device with the visitor identity, wherein the first connection request includes a user identification of the first terminal device.

At step 702, the router transmits an access request for accessing the router, which includes the user identification of the first terminal device, to a second terminal device with access control permissions.

At step 703, the router receives feedback information from the second terminal device which indicates whether the first terminal device is permitted to access to the router.

At step 704, the router determines whether the first terminal device is permitted to the router using a host identity, based on the received feedback information.

In the embodiment, the router permits the first terminal device to perform a connection using the visitor identity, thereby permitting the first terminal device to access the network by limiting the access permission and bandwidth of the first terminal device and the like. When the access permission is limited, the router may obtain the user identification of the first terminal device from the first terminal device, and perform a simple communication with the first terminal device. The router transmits the access request to the second terminal device to ask whether the user as the host permits the first terminal device to access to the router using the host identity, and performs a corresponding process according to the feedback information from the second terminal device, whereby the access control to the first terminal device is realized.

If acknowledge feedback information is received from the second terminal device, the router transmits indication information indicating permission to the first terminal device; and opens the access control permissions, bandwidth and the like for the first terminal device after a feedback from the first terminal device is received. If denial feedback information is received, the router transmits indication information indicating denial of the first terminal device, and terminates the connection to the first terminal device. For security purposes, when the first terminal device is permitted to access to the router using the host identity, the first terminal device may transmit a connection request again (i.e., to transmit a second connection request), and then the router may change the identity of the first terminal device according to the second connection request and open a corresponding access permission and bandwidth.

In one embodiment, the router may be directly connected to the second terminal device, and thus the process proceeds to the steps 702 and 703. In another embodiment, the router may be connected to the second terminal device via a server; and in this case, at step 702, an access request for accessing the router is transmitted to the second terminal device through the server and at step 703, feedback information which indicates whether the first terminal device is permitted to access to the router is transmitted through the server. The above embodiments may be combined. For example, after receiving the first connection request from the first terminal device, the router may detect whether the connection to the second terminal device has been established. If the connection to the second terminal device has been established, the router directly transmits the access request for accessing the router to the second terminal device; and if the connection to the second terminal device has not been established, the router transmits the access request for accessing the router to the second terminal device through the server. A device identification of the second terminal device may be preset in the router, and the router may detect whether the second terminal device is one of the connected devices according to the device identification.

At step 704, when the router receives acknowledgement feedback information, the router permits the first terminal device to access to the router using the host identity, and transmits to the first terminal device indication information which indicates that the first terminal device is permitted to perform connection using the host identity. Then, the router may receive the second connection request for establishing a connection using the host identity, which is transmitted from the first terminal device and includes the indication. The router may be connected to the first terminal device with the host identity.

If the router is provided a password, the indication may include the password. For example, the router permits the first terminal device to access to the router using the host identity, and transmits the password to the first terminal device. The router receives the second connection request for establishing a connection using the host identity from the first terminal device, where the second connection request includes the password. The router may then be connected to the first terminal device with the host identity. The use of the password may improve the security, and it is not required to output the password to the visitor in the access control process. The interactive process with the router may be implemented by the first terminal device without user input or outputting password information to the user.

Figure 8:
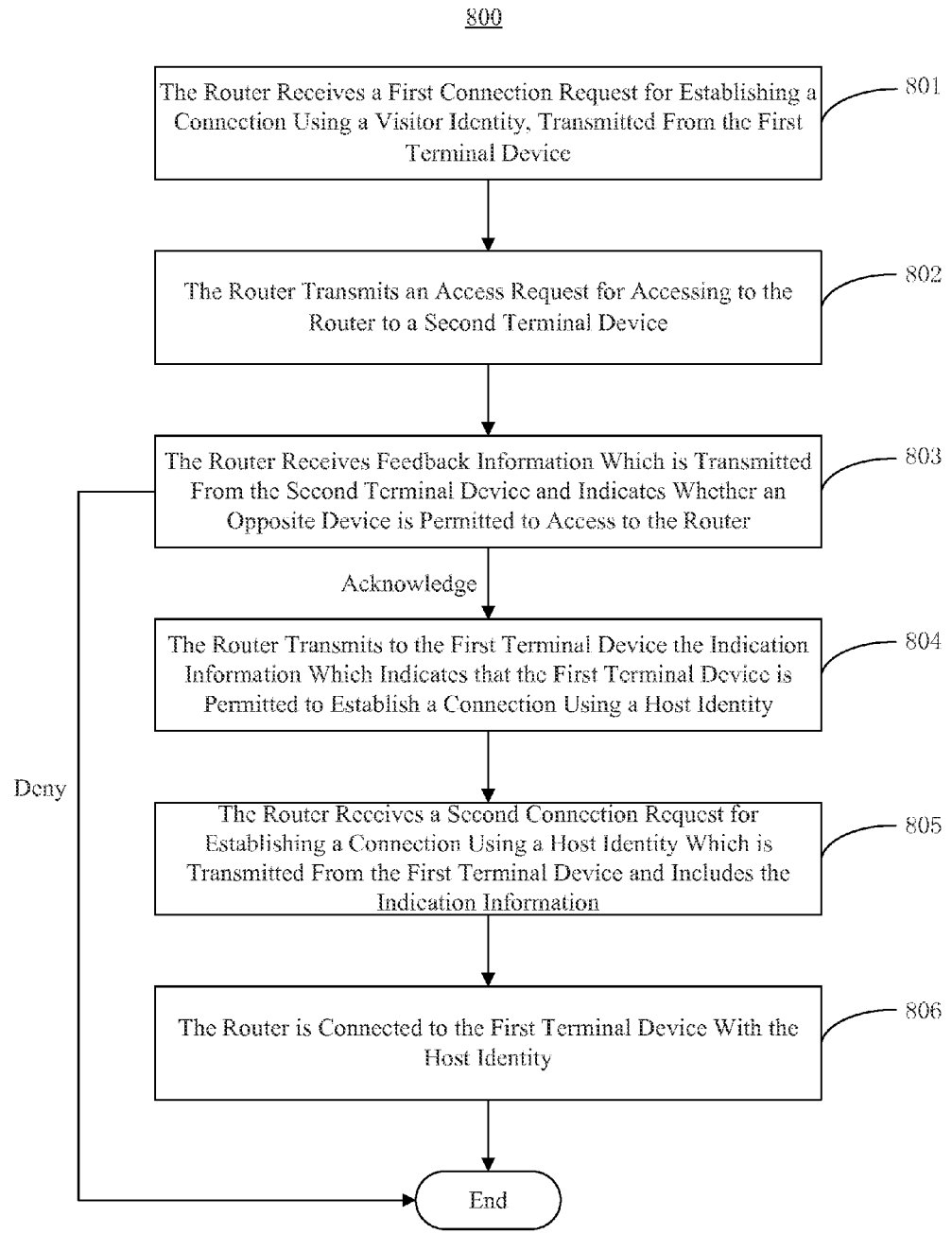
FIG. 8 is a flowchart of a process for controlling access to a router when the router is connected to a second terminal device, according to an exemplary embodiment.

FIG. 8 is a flowchart of a process 800 performed by a router for controlling access to a router, according to an exemplary embodiment.

At step 801, the router receives a first connection request for establishing a connection using a visitor identity, which is transmitted from the first terminal device, and establishes a connection with the first terminal device with the visitor identity. The first connection request includes a user identification of the first terminal device.

At step 802, the router transmits to a second terminal device an access request for accessing the router, which includes the user identification of the first terminal device.

At step 803, the router receives feedback information which is transmitted from the second terminal device and indicates whether the first terminal device is permitted to access the router. If acknowledgement feedback information is received, the process proceeds to step 804; if denial feedback information is received, the process ends, or the router transmits indication information for denying the connection to the first terminal device and is disconnected from the first terminal device.

At step 804, the router transmits to the first terminal device the indication information which indicates that the first terminal device is permitted to perform connection using a host identity. The indication may include an instruction mark when no password is provided in the router.

At step 805, the router receives a second connection request for establishing a connection as a host, which includes the indication, transmitted from the first terminal device.

At step 806, the router is connected to the first terminal device with the host identity.

In this embodiment, the router is directly connected to the second first terminal device. For example, the first and second terminal devices may be located in a same LAN. The router receives the acknowledgement feedback information transmitted from the second terminal device, and then transmits the instruction information to the first terminal device. Correspondingly, the first terminal device initiates the process of changing identity. The router is then reconnected to the first terminal device and opens the access permission and bandwidth for the first terminal device, thereby ensuring the security and improves access control efficiency.

Figure 9:
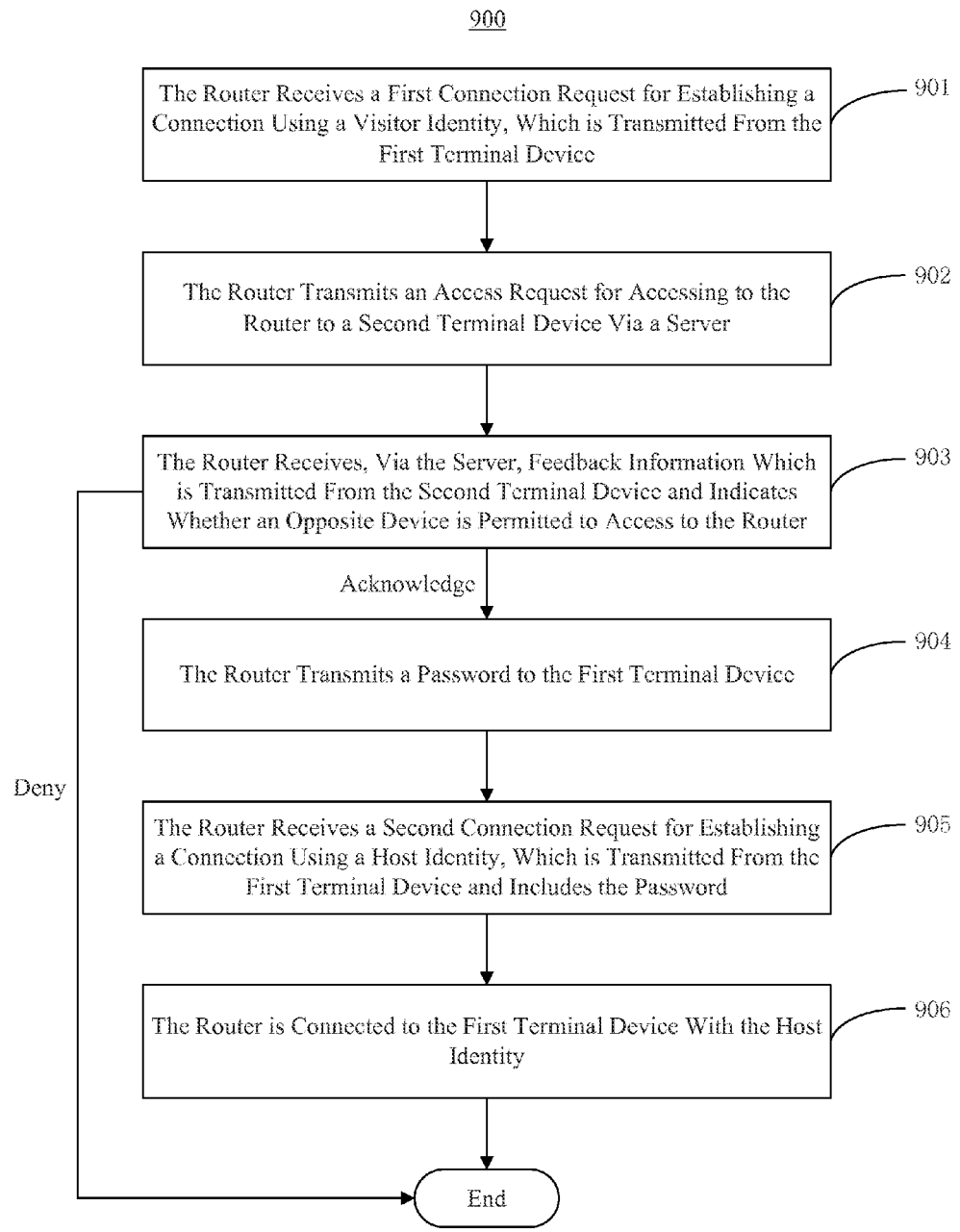
FIG. 9 is a flowchart of a process for controlling access to a router when the router is connected to a server, according to an exemplary embodiment.

FIG. 9 is a flowchart of a process 900 performed by a router for controlling access to the router, according to an exemplary embodiment. In this embodiment, the router is connected to a server.

At step 901, the router receives a first connection request for establishing a connection using a visitor identity which is transmitted from the first terminal device, and is connected to the first terminal device serving using the visitor identity. The first connection request includes a user identification of the first terminal device.

At step 902, the router transmits to a second terminal device via a server an access request for accessing the router, which includes the user identification of the first terminal device.

At step 903, the router receives, through the server, feedback information which is transmitted from the second terminal device and indicates whether the first terminal device is permitted to access to the router. If acknowledgement feedback information is received, the process proceeds to step 904; if denial feedback information is received, the process ends, or the router transmits indication information for denying connection to the first terminal device and is disconnected from the first terminal device.

At step 904, the router transmits a password to the first terminal device.

At step 905, the router receives a second connection request for establishing a connection using a host identity, which is transmitted from the first terminal device and includes the password.

At step 906, the router is connected to the first terminal device with the host identity.

In this embodiment, the router is connected to the second terminal device via the server. For example, the first and second terminal devices may be located in different LANs. The second terminal device may implement the remote control of access to the router, thereby reducing limitations due to distance and area. The router receives the acknowledgement feedback information transmitted from the second terminal device via ther server, then transmits the password to the first terminal device so that the first terminal device starts the process of changing identity, and then is reconnected to the first terminal device and opens the access permissions and bandwidth to the first terminal device. By the use of the password, the security may be further improved while access control efficiency is improved.

Figure 10:
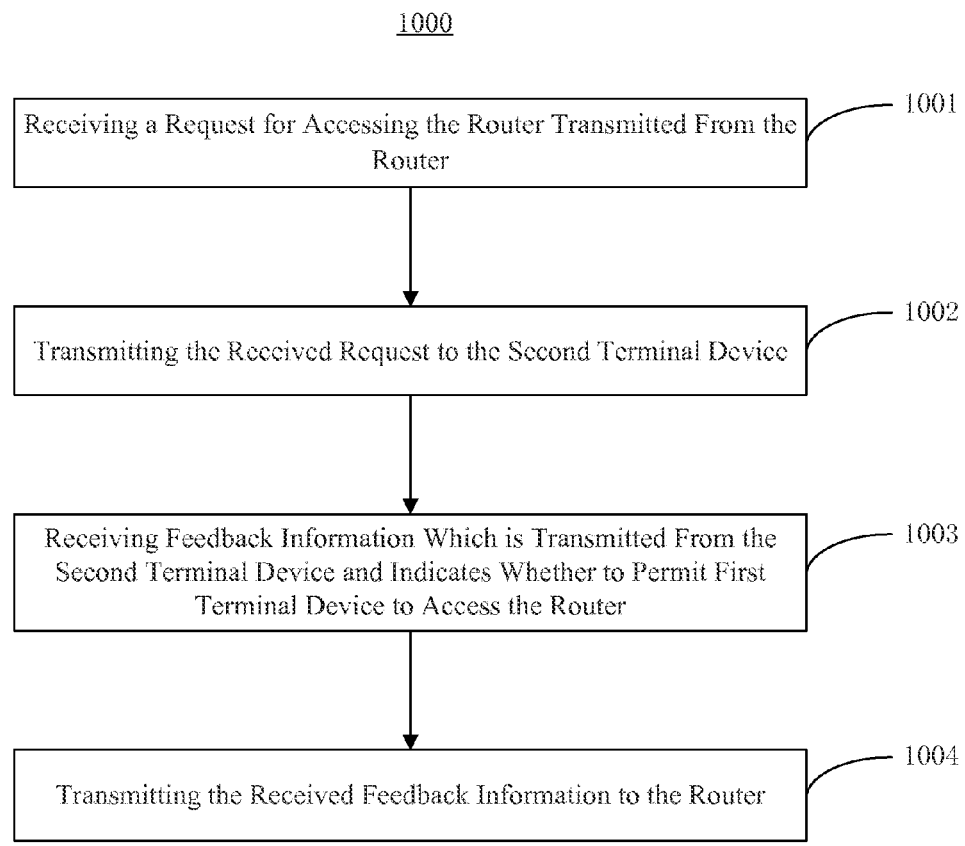
FIG. 10 is a flowchart of a process performed at a server for controlling access to a router, according to an exemplary embodiment.

FIG. 10 is a process 1000 performed at a server controlling access to a router, according to an exemplary embodiment.

At step 1001, the server receives a request for accessing the router transmitted from the router.

At step 1002, the server transmits the received request to the second terminal device.

At step 1003, the server receives feedback information which is transmitted from the second terminal device and indicates whether to permit a first terminal device to access the router.

At step 1004, the server transmits the received feedback information to the router. The server may also instruct the router to determine whether to permit the first terminal device to access the router using a host identity according to the received feedback information.

The server functions as a relay point between the router and the second terminal device, which enables the second terminal device to implement remote access control of the router and reduces geographical restriction.

The above embodiments describe the processes for controlling access to the router from perspectives of each device. Hereinafter, the process for controlling the router will be described in connection with respective devices.

Figure 11:
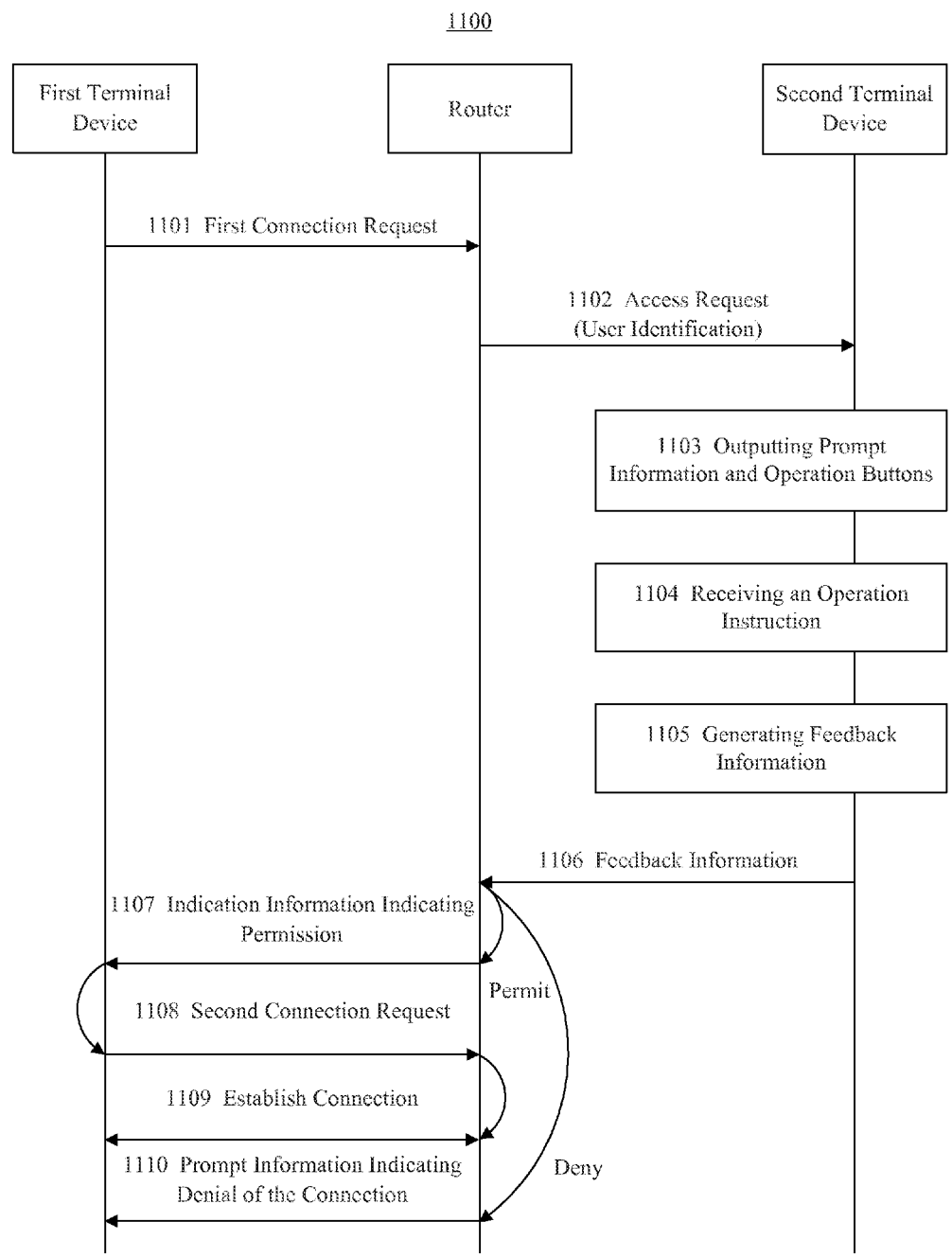
FIG. 11 is a flowchart of a process for controlling access to a router when a server is not present, according to an exemplary embodiment.

FIG. 11 is a process 1100 for controlling access to a router when a server is not present, according to an exemplary embodiment.

At step 1101, a first terminal device transmits a first connection request to a router and accesses the router using a visitor identity.

At step 1102, the router transmits an access request including a user identification of the first terminal device to a second terminal device.

At step 1103, the second terminal device outputs prompt information and operation buttons to a user as a host. The prompt information includes the received user identification.

At step 1104, the second terminal device receives an instruction from the user. The instruction may be triggered by, for example, the user as the host clicks an operation button.

At step 1105, the second terminal device generates corresponding feedback information according to the received instruction.

At step 1106, the second terminal device transmits the feedback information to the router. If the feedback is acknowledgement feedback information, the process proceeds to step 1107; and if the feedback is denial feedback information, the process proceeds to step 1110.

At step 1107, the router transmits to the first terminal device indication information, which indicates that the first terminal device is permitted to perform a connection using the host identity.

At step 1108, the first terminal device transmits a second connection request for establishing a connection to the router, and accesses the router after obtaining permission.

At step 1109, the router is connected to the first terminal device with the host identity.

If the feedback is denial feedback information, at step 1110, the router transmits indication for denying connecting to the first terminal device.

Figure 12:
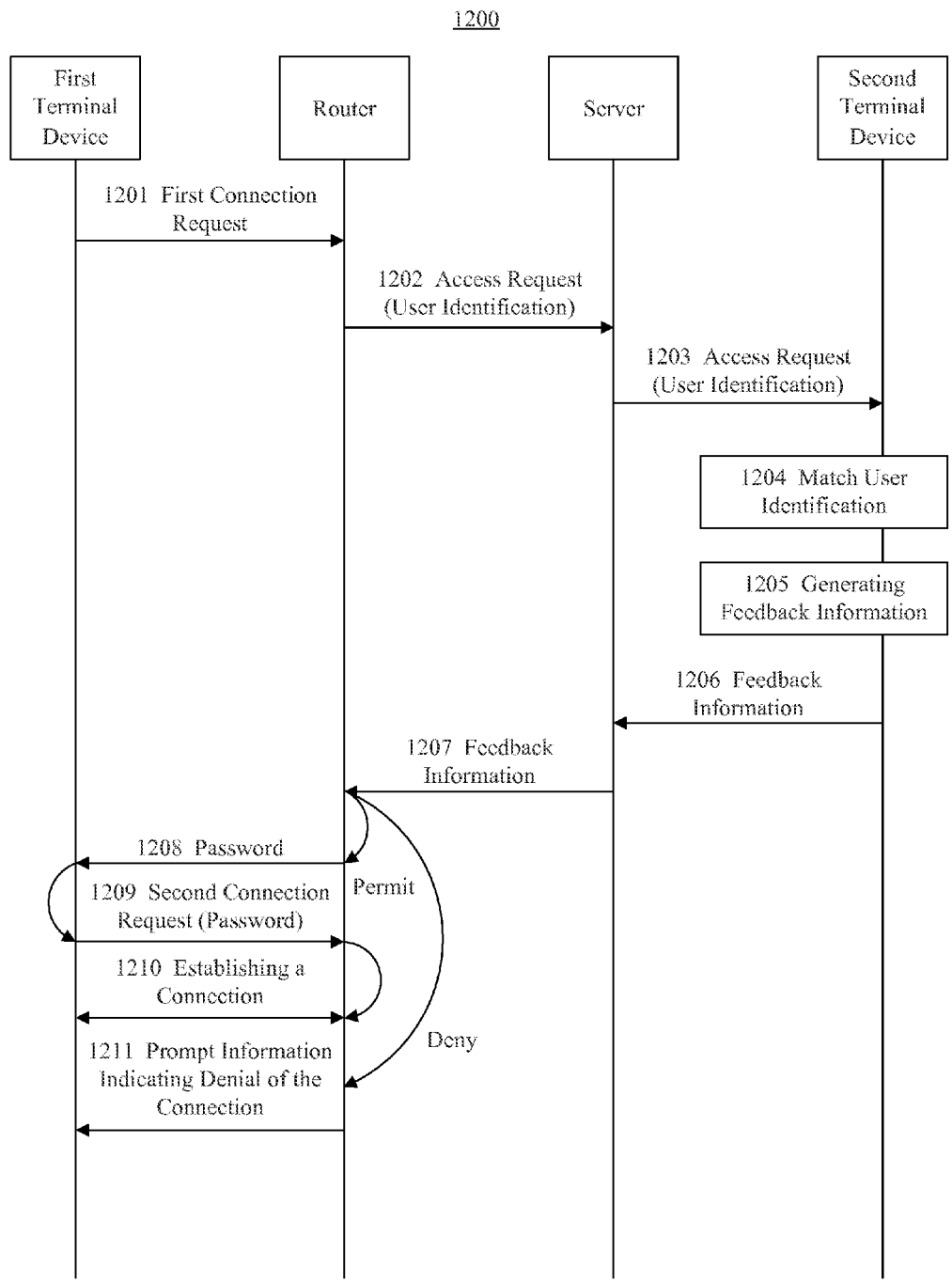
FIG. 12 is a flowchart of a process for controlling access to a router when a server is present, according to an exemplary embodiment.

FIG. 12 is a process 1200 for controlling access to a router when a server is present, according to an exemplary embodiment.

At step 1201, a first terminal device transmits a first connection request to a router and accesses the router using a visitor identity.

At step 1202, the router transmits an access request including a user identification of the first terminal device to a server.

At step 1203, the server transmits an access request including the user identification of the first terminal device to a second terminal device.

At step 1204, the second terminal device compares the received identity with user identifications in a set of user identifications. The set of user identifications may be preset at the second terminal device.

At step 1205, the second terminal device generates feedback information, which indicates whether to permit the first terminal device to access to the router, according to the user identification of the first terminal device.

At step 1206, the second terminal device transmits the generated feedback information to the server.

At step 1207, the server transmits the received feedback information to the router. If the feedback is acknowledgement feedback information, the process proceeds to step 1208; and if the feedback is denial feedback information, the process proceeds to step 1211.

If the received feedback information is acknowledgement feedback information, at step 1208, the router transmits a password to the first terminal device.

At step 1209, the first terminal device transmits a second connection request including the password to the router, and accesses the router using a host identity.

At step 1210, the router is connected to the first terminal device with identity of the host.

If the received feedback information is denial feedback information, at step 1211, the router transmits indication for denying a connection to the first terminal device.

Before steps 1101 (FIGS. 11) and 1202 (FIG. 12), the router may detect whether a connection to the second terminal device has been established. For example, if the connection to the second terminal device has been established, the process may proceed to step 1102 and subsequent steps (FIG. 11). If the connection to the second terminal device has not been established, the process may proceed to step 1202 and subsequent steps (FIG. 12).

The implementation processes for controlling access to the router are described above. The processes may relate to four devices, the internal structure and functions of which will be described hereinafter. The four devices may constitute a system, and the internal structure and functions of the system will be further described hereinafter.

Figure 13:
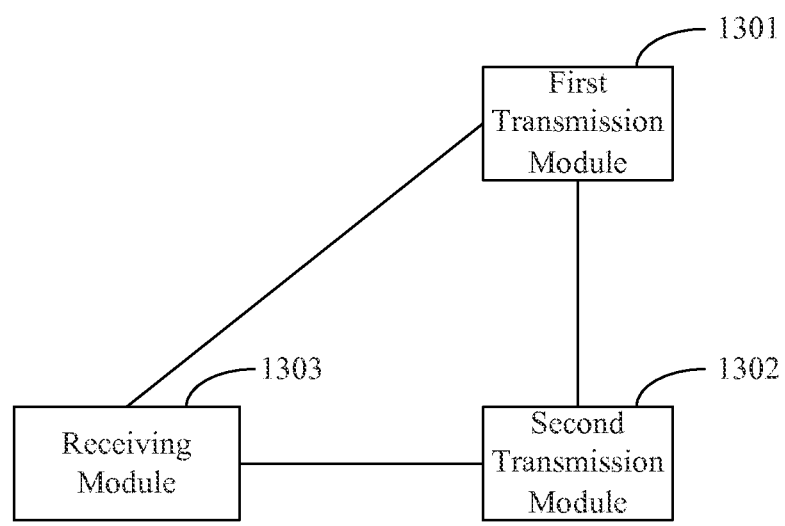
FIG. 13 is a block diagram illustrating a device, according to an exemplary embodiment.

FIG. 13 is a block diagram of a device 1300 (e.g., a first terminal device) for controlling access to a router, according to an exemplary embodiment. The device 1300 includes: a first transmission module 1301, a receiving module 1302 and a second transmission module 1303.

The first transmission module 1301 is configured to transmit to a router a first connection request for establishing a connection using a visitor identity, and access to the router using the visitor identity, wherein the first connection request includes a user identification.

The receiving module 1302 is configured to receive indication information transmitted from the router. The indication information may indicate that the access is permitted.

The second transmission module 1301 is configured to transmit to the router a second connection request for establishing a connection, and access to the router after obtaining permission. The second connection request may include the received indication information.

Figure 14:
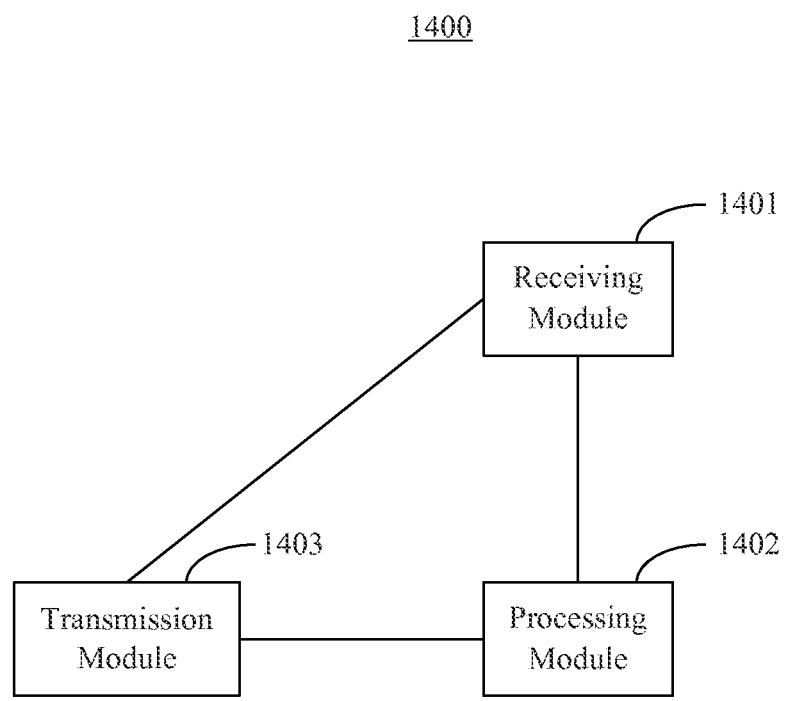
FIG. 14 is a block diagram illustrating a device, according to an exemplary embodiment.

FIG. 14 is a block diagram of a device 1400 (e.g., a second terminal device) for controlling access to a router, according to an exemplary embodiment. The device 1400 includes: a receiving module 1401, a processing module 1402 and a transmission module 1403.

The receiving module 1401 is configured to receive an access request for accessing the router, the access request including a user identification of a first terminal device which requests for accessing the router.

The processing module 1402 is configured to generate feedback information, which indicates whether to permit the first terminal device to access to the router, according to the user identification.

The transmission module 1403 is configured to transmit the generated feedback information.

In one embodiment, the receiving module 1401 receives the access request for accessing the router transmitted from the router; the transmission module 1403 transmits the generated feedback information to the router. In another embodiment, the receiving module 1401 receives the access request for accessing the router transmitted from a server; the transmission module 1403 transmits the generated feedback information to the server. The transmission module 1403 may also instruct the server to transmit the feedback information to the router.

Figure 15:
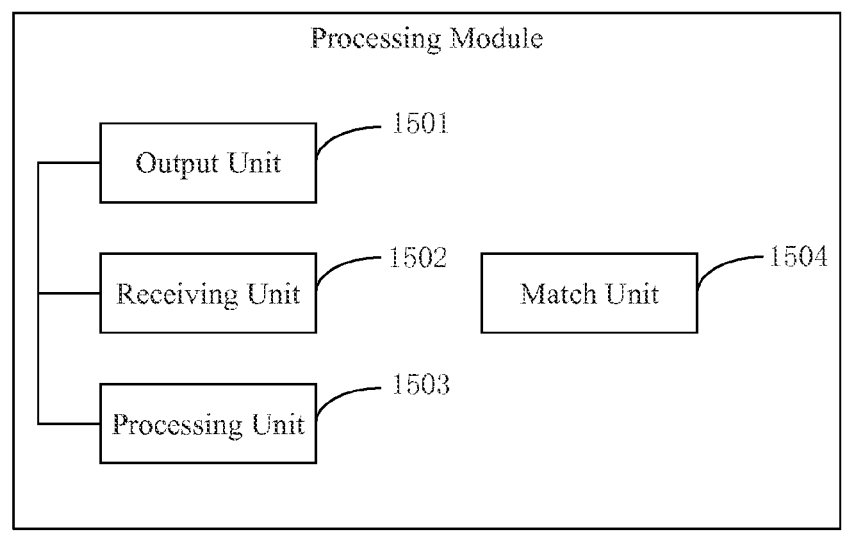
FIG. 15 is a block diagram illustrating a processing module, according to an exemplary embodiment.

FIG. 15 shows a block diagram of the processing module 1402. As shown in FIG. 15, the processing module 1402 includes an output unit 1501, a receiving unit 1502 and a processing unit 1503.

The output unit 1501 is configured to output prompt information including the user identification.

The receiving unit 1502 is configured to receive an operation instruction with respect to the prompt information.

The processing unit 1503 is configured to generate feedback information, which indicates whether to permit the opposite device to access to the router, according to the received operation instruction. For example, if the operation instruction indicates "always agree", the receiving unit 1503 may generate acknowledge feedback information, which indicates that the first terminal device is permitted to access to the router, and stores the user identification of the first terminal device. If the operation instruction indicates "agree only this time", the receiving unit 1503 may generate acknowledge feedback information, which indicates that the first terminal device is permitted to access to the router. If the operation instruction indicates denial, the receiving unit 1503 may generate denial feedback information, which indicates the first terminal device is refused to access to the router.

The processing module 1402 may further include a match unit 1504. The match unit 1504 is configured to compare the received user identification with user identifications in a set of user identifications. If there is a matched user identification, the match unit 1504 may be configured to generate acknowledge feedback information, which indicates that the first terminal device is permitted to access to the router. If there is not any matched user identification, the match unit 1504 may be configured to generate denial feedback information, which indicates the first terminal device is refused to access to the router.

The device 1300 and the device 1400 may be included in a same device, For example, a device may include all of modules in the devices 1300 and 1400.

Figure 16:
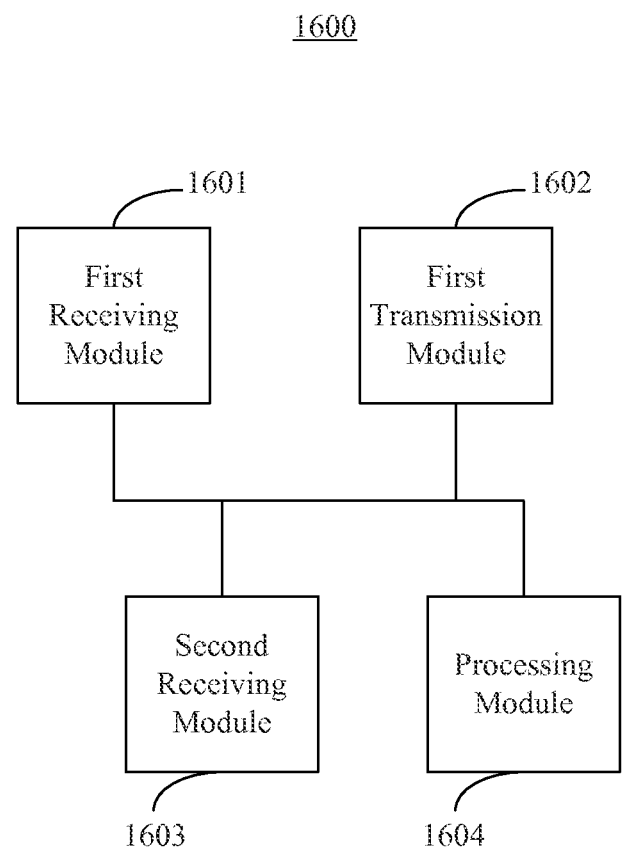
FIG. 16 is a block diagram illustrating a device, according to an exemplary embodiment.

FIG. 16 is a block diagram of a device 1600 (e.g., a router) for controlling access to a router, according to an exemplary embodiment. The device 1600 includes a first receiving module 1601, a first transmission module 1602, a second receiving module 1603 and a processing module 1604.

The first receiving module 1601 is configured to receive a first connection request for establishing a connection to a router using a visitor identity, which is transmitted from a first terminal device, and establish a connection to the first terminal device with the visitor identity, wherein the first connection request includes a user identification of the first terminal device.

The first transmission module 1602 is configured to transmit an access request for accessing the router to a second terminal device with access control permissions. The access request includes the user identification of the first terminal device.

The second receiving module 1603 is configured to receive feedback information which is transmitted from the second terminal device and indicates whether to permit the first terminal device to access to the router.

The processing module 1604 is configured to determine whether to permit the first terminal device to access to the router using a host identity, based on the received feedback information.

In one embodiment, the first transmission module 1602 transmits, via the server, the access request for accessing the router to the second terminal device with the access control permissions; and the second receiving module 1603 receives, via the server, the feedback information, which is transmitted from the second terminal device and indicates whether to permit the first terminal device to access to the route.

Figure 17:
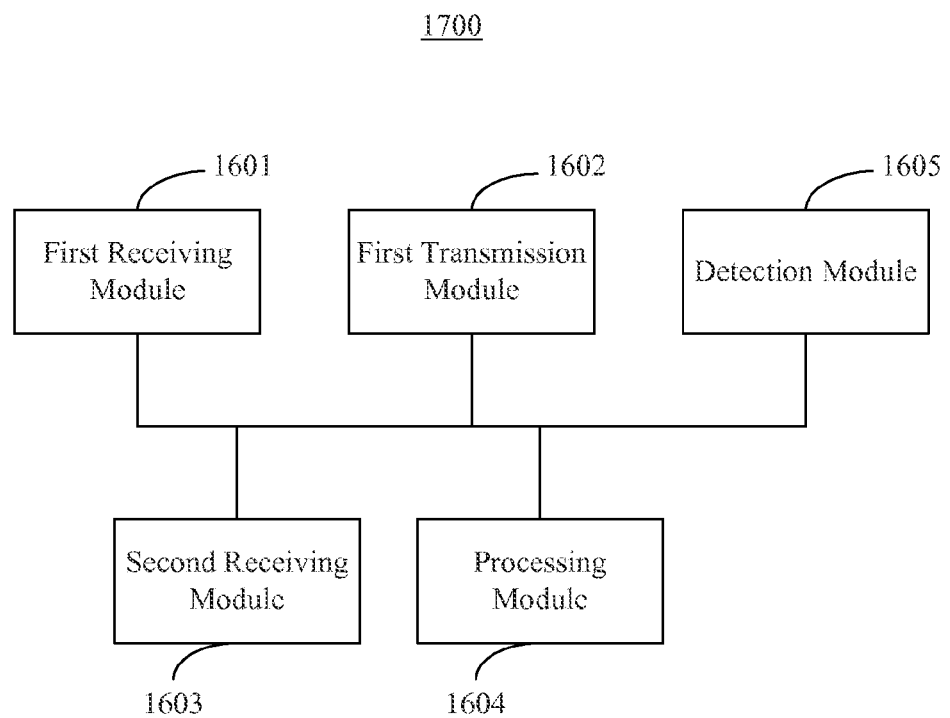
FIG. 17 is a block diagram illustrating a device, according to an exemplary embodiment.

FIG. 17 shows a block diagram of another device 1700 (e.g., a router) for controlling access to a router. As shown in FIG. 17, the device 1700 further includes a detection module 1605 configured to detect whether a connection to the second terminal device has been established.

Figure 18:
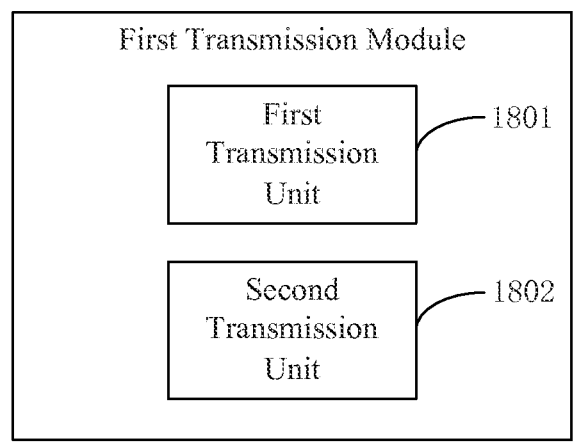
FIG. 18 is a block diagram illustrating a first transmission module, according to an exemplary embodiment.

FIG. 18 shows a block diagram of the first transmission module 1602. As shown in FIG. 18, the first transmission module 1602 includes a first transmission unit 1801 and a second transmission unit 1802.

The first transmission unit 1801 is configured to transmit the access request for accessing the router to the second terminal device with the access control permissions when the connection to the second terminal device has been established.

The second transmission unit 1802 is configured to transmit the access request for accessing the router to the second terminal device with the access control permissions via the server when the connection to the second terminal device has not been established.

If the received feedback information is acknowledgement feedback information indicating that the first terminal device is permitted to access to the router using the host identity, the processing module 1604 (shown in FIG. 16) permits the first terminal device to access to the router using the host identity.

Figure 19:
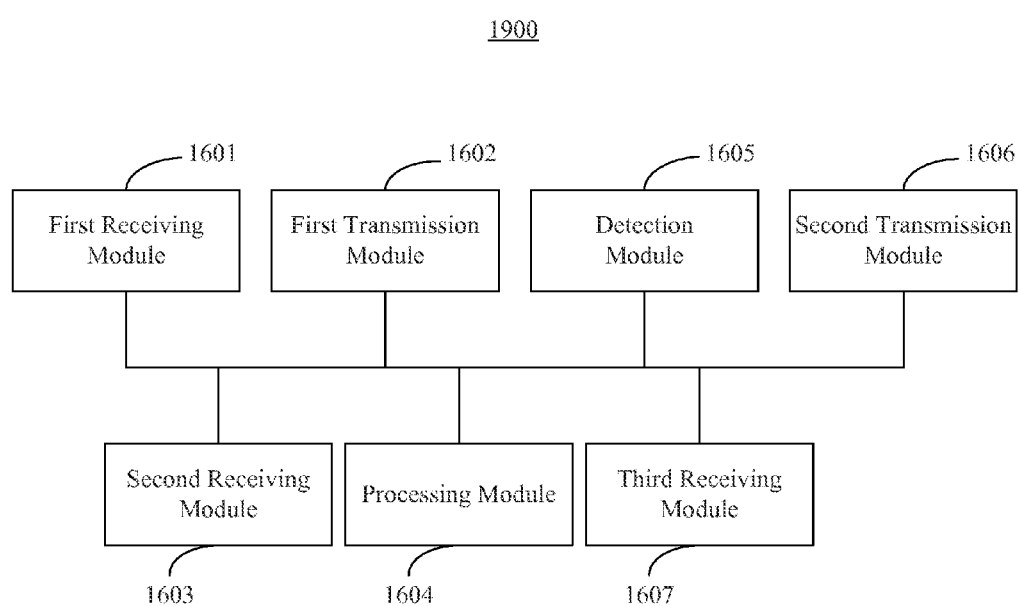
FIG. 19 is a block diagram illustrating a device, according to an exemplary embodiment.

FIG. 19 shows a block diagram of yet another device 1900 (e.g., a router) for controlling access to a router. As shown in FIG. 19, the device 1900 further includes a second transmission module 1606 and a third receiving module 1607.

The second transmission module 1606 is configured to transmit a password to the first terminal device after the first terminal device is permitted to access to the router using the host identity.

The third receiving module 1607 is configured to receive a second connection request for establishing a connection using the host identity from the first terminal device. The second connection request may include the password. The third receiving module 1607 is configured to establish a connection to the first terminal device with the host identity.

Figure 20:
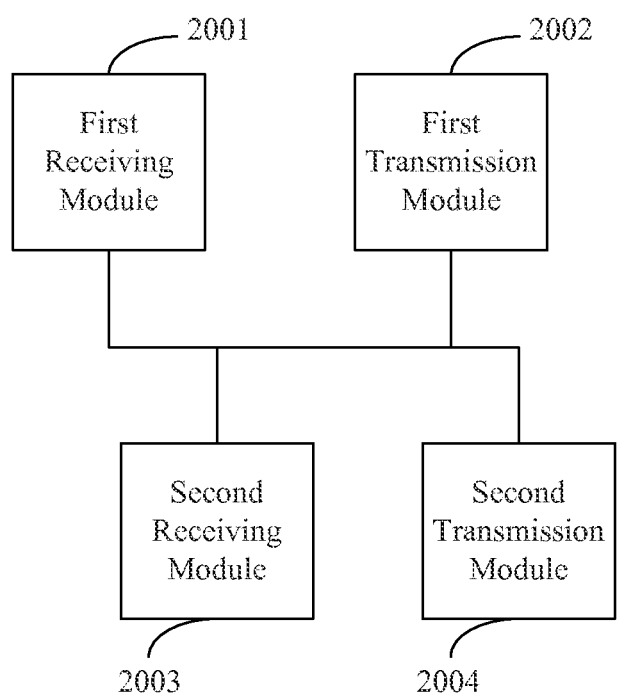
FIG. 20 is a block diagram illustrating a device, according to an exemplary embodiment.

FIG. 20 is a block diagram of a device 2000 (e.g., a server) for controlling access to a router, according to an exemplary embodiment. The device 2000 includes: a first receiving module 2001, a first transmission module 2002, a second receiving module 2003 and a second transmission module 2004.

The first receiving module 2001 is configured to receive an access request for accessing the router transmitted from the router.

The first transmission module 2002 is configured to transmit the received access request to a second terminal device.

The second receiving module 2003 is configured to receive feedback information which is transmitted from the second terminal device and indicates whether to permit a first terminal device to access to the router.

The second transmission module 2004 is configured to transmit the received feedback information to the router. The second transmission may also be configured to instruct the router to determine whether to permit a first terminal device to access to the router using a host identity, according to the received feedback information.

Figure 21:
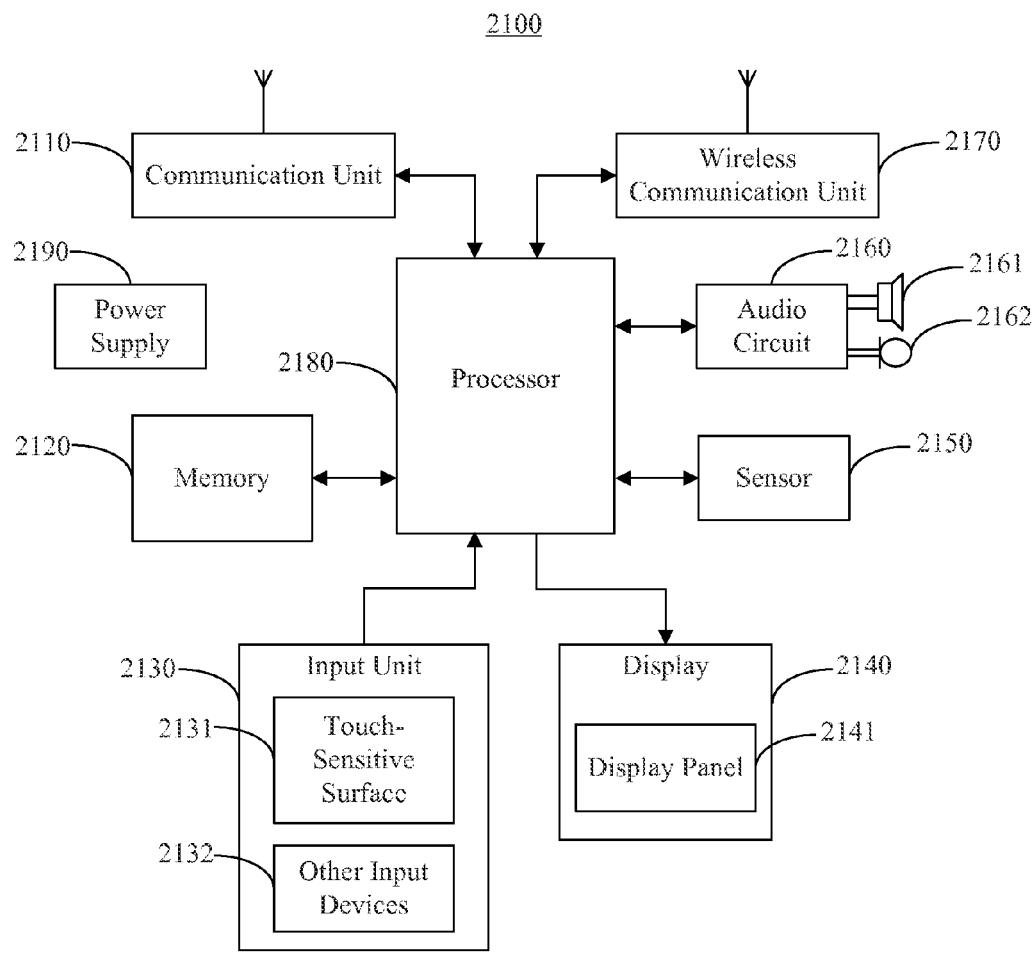
FIG. 21 is a block diagram illustrating a terminal device, according to an exemplary embodiment.

FIG. 21 is a block diagram of a terminal device 2100, according to an exemplary embodiment. The terminal device 2100 may be used to perform any of the above-described method for controlling the access to a router. A hardware environment of a browser, which supports running of client terminal scripting or supports Hypertext Markup Language 5 (HTML5) specification proposed by World Wide Web Consortium (W3C), is described as an example in connection with FIG. 21.

Referring to FIG. 21, the terminal device 2100 may include a communication unit 2110, a memory 2120 including one or more computer readable storage mediums, an input unit 2130, a display 2140, a sensor 2150, an audio circuit 2160, a wireless communication unit 2170, a processor 2180 including one or more processing cores, a power supply 2190. The person skilled in the art should appreciate that the structure of the terminal device 2100 as shown in FIG. 21 does not intend to limit the terminal device 2100. The terminal device 2100 may include more or less components or combine some components or other different components.

The communication unit 2110 is configured to transmit or receive information or to transmit or receive information in a communication process. The communication unit 2110 may be a Radio Frequency (RF) circuit, a router, a modem and the like. Particularly, if the communication unit 2110 is a RF circuit, the communication unit 2110 receives downlink information from the base station and the received information is processed by the processor 2180; and, the communication unit 2110 transmits uplink data to the base station. In general, the RF circuit serving as the communication unit 2110 includes, but not limited to, an antenna, at least one amplifier, a tuner, one or more oscillator, a SIM card, a transceiver, a coupler, a Low Noise Amplifier (LNA), a duplexer and the like. Additionally, the communication unit 2110 may communicates with other device through wireless communication and a network. The wireless communication may adopt any one communication standard or protocol including, but not limited to, Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS) and the like.

The memory 2120 is configured to store programs and modules. The processor 2180 performs various functions and data processing by operating programs and modules stored in the memory 2120. The memory 2120 may mainly include a program storage area and a data storage area. The program storage area may store an operating system, an application for at least one function (such as a function of playing audio, a function of playing photos) and the like. The data storage area may store data (such as audio data, a phone book) created according to usage of the terminal device 2100 and the like. In addition, the memory 2120 may include a high speed random access memory, a nonvolatile memory, for example at least one disk memory, a flash memory or other volatile solid-state memory. Accordingly, the memory 2120 may include a memory controller for providing the processor 2180 and the input unit 2130 with an access to the memory 2120.

The input unit 2130 may be configured to receive inputted digits information or character information, and to generate keyboard signal input, mouse signal input, joystick signal input, optical signal input or trackball signal input which are related to user set and functional control. Optionally, the input unit 2130 may include a touch-sensitive surface 2131 and one or more other input device 2132. The touch-sensitive surface 2131, which is also referred to as a touch screen or a touch pad, may collect touch action performed thereon or thereabout (for example, the user performs operations on the touch sensitive surface 2131 or near the touch sensitive surface 2131 by using fingers, a stylus, or any suitable object or accessory), and drive corresponding connection device according to a preset program. Optionally, the touch-sensitive surface 2131 may include two parts, i.e., a touch detecting device and a touch controller. The touch detecting device detects a location touched by the user and a signal generated from the touch action, and transmits the signal to the touch controller. The touch controller receives touch information from the touch detecting device, converts it into the touch point coordinates, and then transmits the coordinates to the processor 2180. The touch controller may also receive instructions from the processor 2180 and execute the instruction. Additionally, the touch-sensitive surface 2131 may be achieved by adopting various types of touch-sensitive surface, such as a resistive touch-sensitive surface, a capacitive touch-sensitive surface, an infrared touch-sensitive surface and a surface acoustic wave touch-sensitive surface and the like. In addition to the touch-sensitive surface 2131, the input unit 2130 may further include one or more other input device 2132. For example, the other input devices 2132 may include, but are not limited to, one or more of a physical keyboard, a function key (such as a volume control key, a switch key and the like), a trackball, a mouse, a joystick.

The display 2140 is configured to display various kinds of graphic user interfaces of information input by the user or provided to the user or the terminal device 2100. These graphic user interfaces may be made up of graphics, texts, icons, videos and any other combination thereof. The display 2140 may include a display panel 2141. Optionally, the display panel 2141 may be configured in the form of a LCD (Liquid Crystal Display), OLED (Organic Light-Emitting Diode) and the like. Furthermore, the touch sensitive surface 2131 may be configured to cover the display panel 2141. When the touch operation performed on or near the touch sensitive surface 2131 is detected, the touch sensitive surface 2131 may transmit signals to the processor 2180 to determine the type of the touch event, and then the processor 2180 may provide a corresponding visual output on the display panel 2141 according to the type of the touch event. In FIG. 21, although the touch sensitive surface 2131 and the display panel 2141 act as two independent components to achieve the input and output functions, in some embodiments, the touch sensitive surface 2131 and the display panel 2141 may be integrated to achieve the input and output functions.

The terminal device 2100 may further include at least one sensor 2150 such as a photo sensor, a motion sensor and other sensors. For example, the photo sensor may include an ambient light sensor and a proximity sensor. The ambient light sensor may adjust brightness of the display panel 2141 according to intensity of the ambient light. The proximity sensor may turn off the display panel 2141 and/or backlight when the terminal device 2100 is moved to the user's ear. As one type of motion sensors, a gravitational acceleration sensor may detect values of accelerations in various directions (such as along three axes), and may detect a value and a direction of the gravitation when resting, and may be used in an application for identifying a mobile phone pose (such as a horizontal and vertical screen switching, a relevant game, a magnetometer attitude calibration), functions related to vibration (such as a pedometer, a percussion) and the like. The electronic device 2100 may also be configured with a gyroscope, a barometer, a humid meter, a thermometer, an infrared sensor and other sensors, which are not repeated herein.

The audio circuit 2160 is coupled to a speaker 2161 and a microphone 2162, and may provide an audio interface between the user and the terminal device 2100. The audio circuit 2160 may convert the received audio data into electronic signals and transmit the electronic signals to the speaker 2161, and the speaker 2161 may convert the electronic signals into acoustical signals and output the acoustical signals. Additionally, the microphone 2162 may convert the collected acoustical signals into electronic signals. The audio circuit 2160 receives the electronic signals and converts them into audio data, and the audio data is transmitted to the processor 2180 for processing ,and then the processed data is transmitted to another terminal device through the communication unit 2110. or the processed data is transmitted to the memory 2120 for further processing. The audio circuit 2160 may further include an earplug jack for providing a communication between a peripheral earphone and the terminal device 2100.

The wireless communication unit 2170 may be a WIFI module, which provides the user with a wireless broadband Internet access. The terminal device 2100 may assist the user to transmit or receive E-mail, browse web pages and access streaming media and the like through the wireless communication unit 2170. Although the wireless communication unit 2170 is shown in FIG. 21, it should be understood that the wireless communication unit 2170 is not a necessary component for the terminal device 2100, and may be omitted according to requirements.

The processor 2180 is a control center of the terminal device 2100, and connects respective portions of the terminal device 2100 via various interfaces and wires. By running or executing software programs and/or modules stored in the memory 2120, calling data stored in the memory 2120, and executing various functions of the terminal device 2100 and processing data, the processor 2180 performs various functions of the terminal device 2100 and processes data The processor 2180 may include one or more processing cores. For example, the processor 2180 may integrate application processors and modem processors, wherein the application processors may mainly process the operation systems, the user interfaces, the application programs and the like, and the modem processors may mainly process wireless communications. In some embodiments, the modem processors may not be integrated into the processor 2180.

The power supply 2190 is configured to supply power to components of the terminal device 2100. For example, the power supply 2190 may be logically connected with the processor 2180 through a power supply management system, so as to achieve functions of managing charging, discharging, power consumption, and the like. The power supply 2190 may further include any components such as one or more DC or AC power supplies, a rechargeable system, a power supply malfunction detection circuit, a power supply converter or an inverter, a power supply state indicator and the like.

Although not shown, the terminal device 2100 may further include a camera, a Bluetooth module and so on.

In exemplary embodiments, there is provided a non-transitory storage medium including instructions, such as included in the memory 2120, executable by the processor 2180 in the terminal device 2100, for performing the above described methods for controlling access to a router. For example, the storage medium may be a read-only memory, a disc, a CD-ROM, etc.

Figure 22:
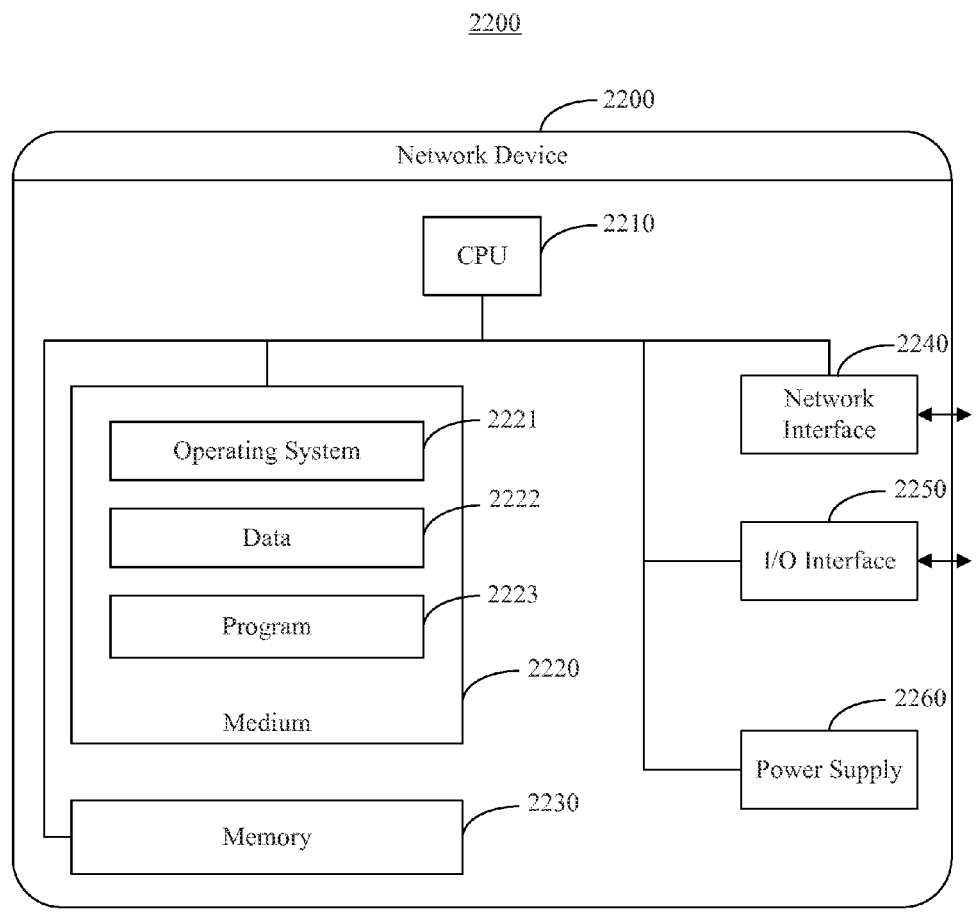
FIG. 22 is a block diagram illustrating a network device, according to an exemplary embodiment.

FIG. 22 is a block diagram illustrating a network device 2200 operating as a router and/or a server, according to an exemplary embodiment. As shown in FIG. 22, the network device 2200 may be used to perform the method for controlling access to the router described in the above embodiments. The network device 2200 may be a high performance computer or computer system or the like in network environment, and may monitor service requests from other computers (clients) and provide a corresponding service.

Preferably, the network device 2200 includes, but is not limited to, the following structure or functions. Preferably, the network device 2200 at least includes one or more central processing unit (CPUs) 2210, one or more memories 2230, one or more mediums 2220 (such as one or more mass memories) configured to store an operating system 2221, application programs 2223 or data 2222.

The one or more memories 2230 and mediums 2220 may be temporary or non-temporary. The programs stored in one or more mediums 2220 may include one or more modules. Each of the modules may include a set of operation instructions of the network device 2200. Furthermore, the CPU 2210 may be configured to communicate with the mediums 2220, perform the set of operation instructions and operations on the network device 2200.

The network device may further include one or more power supplies 2260, one or more wired or wireless network interfaces 2240, one or more I/O interfaces 2250, such as a keyboard, and one or more operating systems 2221, such as Windows Server™, Mac OS X™, Unix™, Linux™, FreeBSD™, or the like.

In exemplary embodiments, there is provided a non-transitory storage medium including instructions, such as included in the memory 2230, executable by the CPU 2210 in the network device 2200, for performing the above described methods for controlling access to a router. For example, the storage medium may be a read-only memory, a disc, a CD-ROM, etc.

Figure 23:
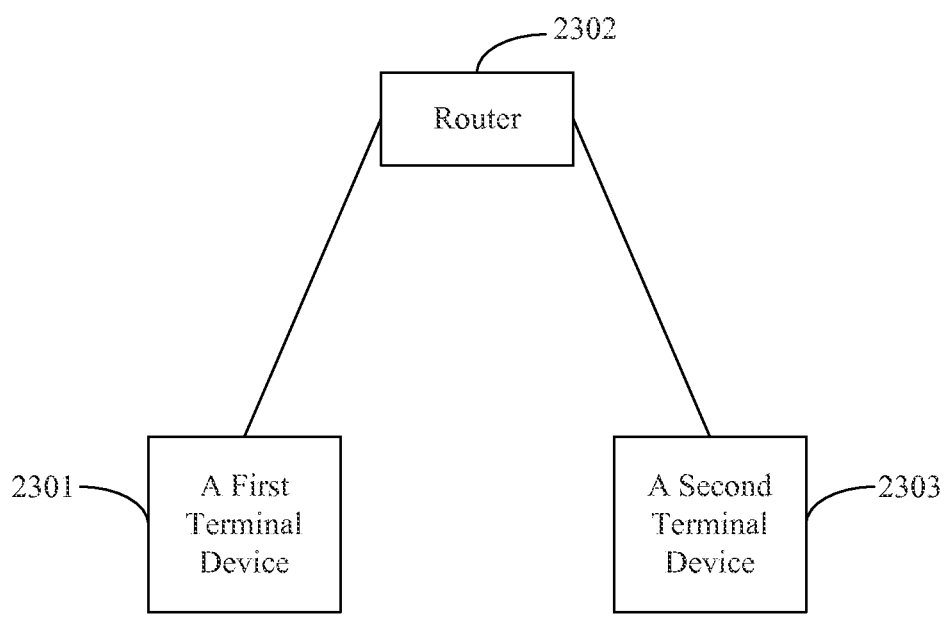
FIG. 23 is a block diagram illustrating a network system, according to an exemplary embodiment.

FIG. 23 is a block diagram illustrating a network system 2300, according to an exemplary embodiment. Referring to FIG. 23, the network system 2300 includes a first terminal device 2301, a router 2302 and a second terminal device 2303.

The first terminal device 2301 is configured to transmit to the router 2302 a first connection request for establishing a connection using a visitor identity, and access the router 2302 using the visitor identity, wherein the first connection request includes a user identification. The first terminal 2301 is configured to access to the router 2302 using the host identity when getting permission from the router.

The router 2302 is configured to receive the first connection request for establishing a connection using the visitor identity transmitted from the first terminal device 2301, and establish a connection to the first terminal device 2301 with the visitor identity, wherein the first connection request includes the user identification of the first terminal device 2301. The router 2302 is configured to transmit an access request for accessing the router, which includes the user identification of the first terminal device 2301, to a second terminal device 2303 with access control permissions; receive feedback information, which is transmitted from the second terminal device 2303 and indicates whether to permit an opposite device to access to the router; and determine whether to permit the first terminal device 2301 to access to the router using a host identity, according to the received feedback information.

The second terminal device 2303 is configured to receive the access request for accessing the router 2302 including the user identification of the first terminal device 2301 which requests for accessing the router. The second terminal device 2302 is configured to generate feedback information, which indicates whether to permit the first terminal device 2301 to access to the router 2302, based on the user identification, and transmit the generated feedback information to the router 2302.

Figure 24:
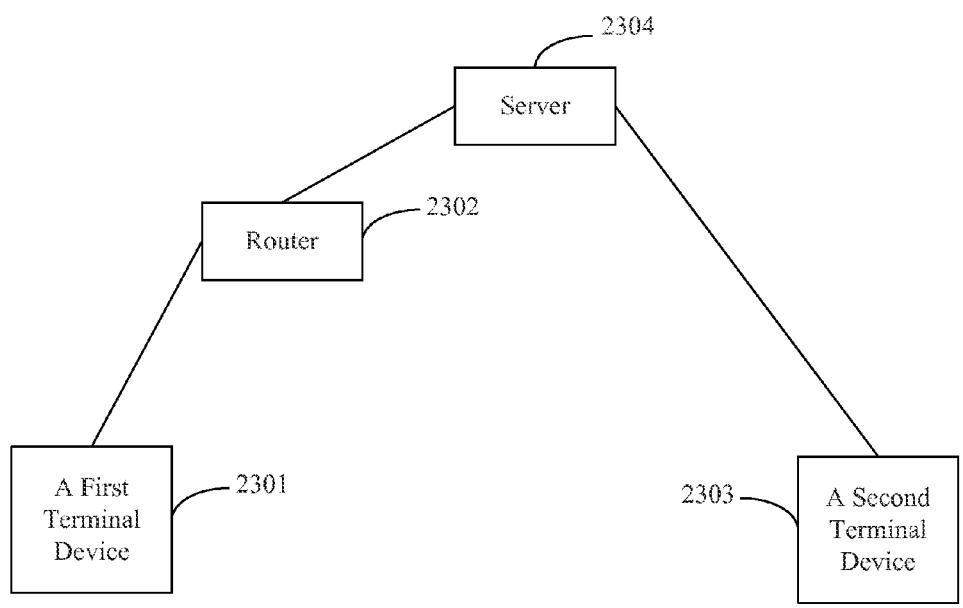
FIG. 24 is a block diagram illustrating a network system, according to an exemplary embodiment.

FIG. 24 is a block diagram illustrating a network system 2400, according to an exemplary embodiment. Referring to FIG. 24, the network system 2400 further includes a server 2304. The server 2304 is configured to relay access requests and feedback information between the first and second terminal devices.

In one embodiment, the first terminal device 2301 serving as a visitor is connected to the router 2302 using a visitor identity to obtain a password, and then is connected to the router 2302 using a host identity using the password. It may not be required for the user as the visitor to manually input the password, thereby simplifying the operation and improving the efficiency of access to the router 2302.

In exemplary embodiments, the terminal device described above may be a hand-held terminal device, such as a mobile phone, a PDA or the like.

In exemplary embodiments, the non-transitory computer readable storage medium may be a read-only memory (ROM), a programmable read-only memory (PROM), an erasable programmable read-only memory (EPROM), an electrically erasable programmable read-only memory (EEPROM), a flash memory, a random access memory (RAM) which may serves as an external cache memory. RAM may be realized, for example, but not limited to, in a plurality of manners, such as a DRAM, a DRAM, a SDRAM, a DDR SDRAM, an ESDRAM, a SLDRAM and a DRRAM. The computer-readable storage medium in the present disclosure intends to include, but not limited to, these and other kinds of memory. The computer-readable storage medium may also be a compression disk (CD), a laser disc, an optical disk, a digital versatile disc (DVD), a floppy disks, a blue-ray disk, etc.

The various exemplary logic, module, circuit and arithmetic steps described herein may be realized by the following parts which are designed to perform the functions described herein: a general-purpose processor, a digital signal processor (DSP), a Application Specific Integrated Circuit (ASIC), a Field Programmable Gata Array (FPGA) or other Programmable Logic Device, a discrete gate or transistor logic, discrete hardware or a combination of thereof, such as , a combination of DSP and a microprocessor, a plurality of microprocessors, a combination of one or more microprocessors and DSP core, or any other such configuration.

One of ordinary skill in the art will understand that the above described modules can each be implemented by hardware, or software, a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof It is intended that the scope of the invention only be limited by the appended claims.

What is claimed is:

1. A method for controlling access to a router, comprising:
   transmitting, from a first terminal device, a first connection request for establishing a connection using a visitor identity to a router, wherein the first connection request comprises a user identification of the first terminal device;
   receiving, by the first terminal device, indication information which is transmitted from a second terminal device with access control permissions, the indication information indicating that access to the router using a host identity is permitted, wherein the host identity is associated with a host of the router, and an access bandwidth with the visitor identity is lower than an access bandwidth with the host identity;
   transmitting, from the first terminal device, a second connection request for establishing a connection to the router, wherein the second connection request comprises the received indication information; and
   connecting to the router using the host identity after transmitting the second connection request to the router.

2. A method for controlling access to a router, comprising:
   receiving, by a second terminal device with access control permissions, an access request transmitted from a server for accessing a router, the access request comprising a user identification of a first terminal device which requests for access to the router, wherein the access request is transmitted from the server after the router receives a connection request transmitted from the first terminal device, the connection request being transmitted using a visitor identity;
   generating, by the second terminal device with access control permissions, feedback information based on the user identification of the first terminal device, wherein the feedback information indicates whether to permit the first terminal device to access the router using a host identity, and wherein the host identity is associated with a host of the router, and an access bandwidth with the visitor identity is lower than an access bandwidth with the host identity;
   transmitting to the server the generated feedback information; and transmitting to the server an instruction instructing the server to transmit the feedback information to the router, wherein the router establishes a connection to the first terminal device using the host identity after receiving the feedback information.

3. The method according to claim 2, further comprising:
   outputting prompt information comprising the user identification; and
   receiving an operation instruction in response to the prompt information.

4. The method according to claim 3, wherein the feedback information is generated according to the received operation instruction.

5. A method for controlling access to a router, comprising:
   receiving, from a first terminal device, a first connection request for establishing a connection using a visitor identity, which is transmitted from the first terminal device, and establishing a connection to the first terminal device with the visitor identity, wherein the first connection request comprises a user identification of the first terminal device;
   transmitting an access request for accessing the router to a second terminal device with access control permissions, wherein the access request comprises the user identification of the first terminal device;
   receiving, from the second terminal device, feedback information which is transmitted from the second terminal device, the feedback information indicating whether to permit the first terminal device to access the router using a host identity, wherein the host identity is associated with a host of the router, and an access bandwidth with the visitor identity is lower than an access bandwidth with the host identity;
   determining that the first terminal device is permitted to access to the router using the host identity, according to the received feedback information;
   transmitting indication information to the first terminal device, the indication information indicating that the first terminal device is permitted to access to the router using the host identity;
   receiving a second connection request for establishing a connection which is transmitted from the first terminal device, the second connection request including the indication information; and
   establishing a connection to the first terminal device using the host identity.

6. The method according to claim 5, wherein,
   the access request for accessing the router is transmitted to the second terminal device via a server; and
   the feedback information which is transmitted from the second terminal device is received via the server.

7. The method according to claim 5, further comprising:
   detecting whether a connection to the second terminal device has been established;
   transmitting the access request directly to the second terminal device when detecting that the connection to the second terminal device has been established; and
   transmitting, via a server, the access request to the second terminal device when detecting that the connection to the second terminal device has not been established.

8. The method according to claim 5,
   wherein the indication information includes a password.

9. A second terminal device, comprising:
   a processor; and
   a memory for storing instructions executable by the processor, wherein the processor is configured to:
   receive, from a server, an access request for accessing a router, the access request including a user identification of a first terminal device requesting for accessing the router, wherein the access request is transmitted from the server after the router receives a connection request transmitted from the first terminal device, the connection request being transmitted using a visitor identity;
   generate, by the second terminal device with access control permissions, feedback information based on the user identification of the first terminal device, the feedback information indicating whether to permit the first terminal device to access the router using a host identity, wherein the host identity is associated with a host of the router, and an access bandwidth with the visitor identity is lower than an access bandwidth with the host identity; and transmit to the server the generated feedback information; and transmit to the server an instruction instructing the server to transmit the feedback information to the router, wherein the router establishes a connection to the first terminal device using the host identity after receiving the feedback information.

10. A router, comprising:

a processor; and a memory for storing instructions executable by the processor, wherein the processor is configured to:

receive, from a first terminal device, a first connection request for establishing a connection using a visitor identity, which is transmitted from the first terminal device, and establish a connection to the first terminal device with the visitor identity, wherein the first connection request comprises a user identification of the first terminal device;

transmit an access request for accessing the router to a second terminal device with access control permissions, wherein the access request comprises the user identification of the first terminal device;

receive, from the second terminal device, feedback information which is transmitted from the second terminal device, the feedback information indicating whether to permit the first terminal device to access to the router using a host identity, wherein the host identity is associated with a host of the router, and an access bandwidth with the visitor identity is lower than an access bandwidth with the host identity;

determine that the first terminal device is permitted to access to the router using the host identity, according to the received feedback information;

transmit indication information to the first terminal device, the indication information indicating that the first terminal device is permitted to access to the router using the host identity;

receive a second connection request for establishing a connection which is transmitted from the first terminal device, the second connection request including the indication information; and establish a connection to the first terminal device using the host identity.

* * * * *